United States Patent
Zweigle et al.

(10) Patent No.: US 12,436,288 B2
(45) Date of Patent: Oct. 7, 2025

(54) GENERATING ENVIRONMENTAL MAP BY ALIGNING CAPTURED SCANS

(71) Applicant: FARO Technologies, Inc., Lake Mary, FL (US)

(72) Inventors: Oliver Zweigle, Stuttgart (DE); Mark Brenner, Asperg (DE); Aleksej Frank, Kornwestheim (DE); Ahmad Ramadneh, Kornwestheim (DE)

(73) Assignee: FARO Technologies, Inc., Lake Mary, FL (US)

( * ) Notice: Subject to any disclaimer, the term of this patent is extended or adjusted under 35 U.S.C. 154(b) by 826 days.

(21) Appl. No.: 17/737,250

(22) Filed: May 5, 2022

(65) Prior Publication Data

US 2022/0365217 A1 Nov. 17, 2022

Related U.S. Application Data

(60) Provisional application No. 63/187,467, filed on May 12, 2021.

(51) Int. Cl.
*G01S 17/89* (2020.01)
*G01S 7/484* (2006.01)
*G06V 10/77* (2022.01)

(52) U.S. Cl.
CPC .............. *G01S 17/89* (2013.01); *G01S 7/484* (2013.01); *G06V 10/7715* (2022.01)

(58) Field of Classification Search
CPC ...... G01S 17/89; G01S 7/484; G06V 10/7715
USPC ........................................................ 382/294
See application file for complete search history.

(56) References Cited

U.S. PATENT DOCUMENTS

| | | | |
|---|---|---|---|
| 10,019,677 B2* | 7/2018 | Gill | ...................... G06Q 10/067 |
| 10,445,913 B2 | 10/2019 | Santos et al. | |
| 10,819,883 B2 | 10/2020 | Zweigle et al. | |
| 10,824,773 B2 | 11/2020 | Santos et al. | |
| 10,891,769 B2 | 1/2021 | Santos et al. | |
| 10,989,532 B2 | 4/2021 | Buback et al. | |
| 11,086,015 B2 | 8/2021 | Pompe et al. | |
| 11,274,929 B1* | 3/2022 | Afrouzi | ..................... G06T 7/30 |
| 2003/0137449 A1 | 7/2003 | Vashisth et al. | |

(Continued)

OTHER PUBLICATIONS

European Search Report; Issued: Oct. 10, 2022; Application No. 22172252.3, Filed: May 9, 2022; 12 pages.

*Primary Examiner* — Allen H Nguyen
(74) *Attorney, Agent, or Firm* — McCarter & English, LLP

(57) ABSTRACT

A method for performing a simultaneous location and mapping of a scanner device in a surrounding environment includes capturing a scan-data of a portion of a map of the surrounding environment. The scan-data comprises a point cloud. Further, at runtime, a user-interface is used to make, a selection of a feature from the scan-data, and a selection of a submap that was previously captured. The submap includes the same feature. The method further includes determining a first scan position as a present position of the scanner device, and determining a second scan position as a position of the scanner device. The method further includes determining a displacement vector for the map based on the first and the second scan positions. Further, a revised first scan position is computed based on the second scan position and the displacement vector. The scan-data is registered using the revised first scan position.

20 Claims, 17 Drawing Sheets

(56) References Cited

U.S. PATENT DOCUMENTS

| | | |
|---|---|---|
| 2011/0123135 A1 | 5/2011 | Hsieh et al. |
| 2012/0069352 A1 | 3/2012 | Ossig et al. |
| 2018/0204338 A1* | 7/2018 | Narang .................. G06T 7/55 |
| 2021/0073692 A1* | 3/2021 | Saha .................... G08B 21/16 |
| 2021/0136350 A1 | 5/2021 | Zweigle et al. |
| 2021/0141061 A1 | 5/2021 | Zweigle et al. |
| 2021/0183081 A1 | 6/2021 | Wohlfeld et al. |
| 2021/0232800 A1 | 7/2021 | Wohlfeld et al. |
| 2021/0373165 A1 | 12/2021 | Brenner et al. |
| 2021/0373167 A1 | 12/2021 | Buback et al. |
| 2021/0374978 A1 | 12/2021 | Döring et al. |
| 2022/0046221 A1 | 2/2022 | Brenner et al. |
| 2022/0051422 A1 | 2/2022 | Parian |
| 2022/0057518 A1 | 2/2022 | Brenner et al. |
| 2022/0137223 A1 | 5/2022 | Brenner et al. |
| 2022/0182853 A1 | 6/2022 | Nagalla et al. |
| 2022/0207759 A1 | 6/2022 | Parian |
| 2022/0318540 A1 | 10/2022 | Wohlfeld et al. |

* cited by examiner

GENERATING ENVIRONMENTAL MAP BY ALIGNING CAPTURED SCANS

CROSS REFERENCE TO RELATED APPLICATIONS

This application claims the benefit of U.S. Provisional Application Ser. No. 63/187,467, filed May 12, 2021, the entire disclosure of which is incorporated herein by reference.

BACKGROUND

The present application is directed to a system that optically scans an environment, such as a building, and in particular to a mobile scanning system that generates two-dimensional (2D) and three-dimensional (3D) scans of the environment. The scans are registered or stitched together to generate a map of the environment.

Automated scanning of an environment is desirable as a number of scans may be performed in order to obtain a complete scan of the area. Various techniques may be used, such as time-of-flight (TOF) or triangulation methods, for example. A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate an image, 2D/3D, representing the scanned area or object. Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the digital images from the camera may be transmitted to a processor to add color to the scanner image. To generate a color scanner image, at least three positional coordinates (such as x, y, z) and three color values (such as red, green, blue "RGB") are collected for each data point.

In contrast, a triangulation system, such as a scanner, projects either a line of light (e.g., from a laser line probe) or a pattern of light (e.g., from a structured light) onto the surface. In this system, a camera is coupled to a projector in a fixed mechanical relationship. The light/pattern emitted from the projector is reflected off of the surface and detected by the camera. Since the camera and projector are arranged in a fixed relationship, the distance to the object may be determined from captured images using trigonometric principles. Triangulation systems provide advantages in quickly acquiring coordinate data over large areas.

In some systems, during the scanning process, the scanner acquires, at different times, a series of images of the patterns of light formed on the object surface. These multiple images are then registered relative to each other so that the position and orientation of each image relative to the other images are known. Where the scanner is handheld, various techniques have been used to register the images. One common technique uses features in the images to match overlapping areas of adjacent image frames. This technique works well when the object being measured has many features relative to the field of view of the scanner. However, if the object contains a relatively large flat or curved surface, the images may not properly register relative to each other.

A 3D image of a scene may require multiple scans from different registration positions. The overlapping scans are registered in a joint coordinate system, for example, as described in U.S. Published Patent Application No. 2012/0069352 ('352), the contents of which are incorporated herein by reference. Such registration is performed by matching targets in overlapping regions of the multiple scans. The targets may be artificial targets such as spheres or checkerboards or they may be natural features such as corners or edges of walls. Some registration procedures involve relatively time-consuming manual procedures such as identifying, by an operator, each target and matching the targets obtained by the scanner in each of the different registration positions. Some registration procedures also require establishing an external "control network" of registration targets measured by an external device such as a total station.

However, even with these improvements, it is today difficult to remove the need for an operator to carry out the manual registration steps as described above. In a typical case, only 30% of 3D scans can be automatically registered to scans taken from other registration positions. Today such registration is seldom carried out at the site of the 3D measurement but instead in a remote location following the scanning procedure. In a typical case, a project requiring a week of scanning requires two to five days to manually register the multiple scans. This adds to the cost of the scanning project. Furthermore, the manual registration process sometimes reveals that the overlap between adjacent scans was insufficient to provide proper registration. In other cases, the manual registration process may reveal that certain sections of the scanning environment have been omitted. When such problems occur, the operator must return to the site to obtain additional scans. In some cases, it is not possible to return to a site. A building that was available for scanning at one time may be impossible to access at a later time for example. Further, a forensics scene of an automobile accident or a homicide is often not available for taking of scans for more than a short time after the incident.

It should be appreciated that where an object (e.g. a wall, a column, or a desk) blocks the beam of light, that object will be measured but any objects or surfaces on the opposite side will not be scanned since they are in the shadow of the object relative to the scanner. Therefore, to obtain a more complete scan of the environment, the TOF scanner is moved to different locations and separate scans are performed. Subsequent to the performing of the scans, the 3D coordinate data (i.e. the point cloud) from each of the individual scans are registered to each other and combined to form a 3D image or model of the environment.

Some existing measurement systems have been mounted to a movable structure, such as a cart, and moved on a continuous basis through the building to generate a digital representation of the building. However, these provide generally lower data quality than stationary scans. These systems tend to be more complex and require specialized personnel to perform the scan. Further, the scanning equipment including the movable structure may be bulky, which could further delay the scanning process in time sensitive situations, such as a crime or accident scene investigation.

Further, even though the measurement system is mounted to a movable cart, the cart is stopped at scan locations so that the measurements can be performed. This further increases the time to scan an environment.

Accordingly, while existing scanners are suitable for their intended purposes, what is needed is a scanner having certain features of embodiments of the present disclosure.

BRIEF DESCRIPTION

According to one or more embodiments, a system includes a scanner device configured to capture scan-data of a surrounding environment. The system further includes one or more processors operably coupled to the scanner device. The one or more processors are operable to perform simultaneous locating and mapping (SLAM) of the scanner device in the surrounding environment. Performing SLAM includes capturing the scan-data of a portion of a map of the surrounding environment, wherein the scan-data comprises a point cloud. Performing SLAM further includes receiving, at runtime, via a user-interface, a selection of a feature from the scan-data, and a selection of a submap that was previously captured, wherein the submap includes the same feature. Performing SLAM further includes determining a first scan position as a present position of the scanner device, and determine a second scan position as a position of the scanner device. Performing SLAM further includes determining a displacement vector for the map based on a difference between the first scan position and the second scan position. Performing SLAM further includes computing a revised first scan position based on the second scan position and the displacement vector. Performing SLAM further includes registering the scan-data using the revised first scan position.

According to one or more embodiments, the one or more processors are operable to assign a unique identifier to the feature.

According to one or more embodiments, the feature comprises a semantic feature in the map. According to one or more embodiments, the feature comprises a predetermined area in the map.

According to one or more embodiments, the one or more processors are configured to provide, via the user-interface, an identification of one or more features in the scan-data.

According to one or more embodiments, the one or more processors are configured to provide, via the user-interface, a list of submaps that include the feature that is selected.

According to one or more embodiments, the scanner device is equipped on a movable platform.

According to one or more embodiments, the one or more processors are further operable to determine a constraint by computing a relationship between a first measurement and a second measurement of the feature, the first measurement captured from the first scan position, and the second measurement captured from a third scan position. The one or more processors are further configured to perform the simultaneous locating and mapping by using the constraint.

According to one or more embodiments, a method for performing a simultaneous location and mapping of a scanner device in a surrounding environment includes capturing a scan-data of a portion of a map of the surrounding environment, wherein the scan-data comprises a point cloud. The method further includes receiving, at runtime, via a user-interface, a selection of a feature from the scan-data, and a selection of a submap that was previously captured, wherein the submap includes the same feature. The method further includes determining a first scan position as a present position of the scanner device, and determine a second scan position as a position of the scanner device. The method further includes determining a displacement vector for the map based on a difference between the first scan position and the second scan position. The method further includes computing a revised first scan position based on the second scan position and the displacement vector. The method further includes registering the scan-data using the revised first scan position.

According to one or more embodiments, a non-transitory computer-readable medium having program instructions embodied therewith, the program instructions readable by a processor to cause the processor to perform a method performing a simultaneous location and mapping of a scanner device in a surrounding environment. The method includes receiving, at runtime, via a user-interface, a selection of a feature from the scan-data, and a selection of a submap that was previously captured, wherein the submap includes the same feature. The method further includes determining a first scan position as a present position of the scanner device, and determine a second scan position as a position of the scanner device. The method further includes determining a displacement vector for the map based on a difference between the first scan position and the second scan position. The method further includes computing a revised first scan position based on the second scan position and the displacement vector. The method further includes registering the scan-data using the revised first scan position.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages are apparent from the following detailed description taken in conjunction with the accompanying drawings in which:

The detailed description explains embodiments, together with advantages and features, by way of example, with reference to the drawings.

DETAILED DESCRIPTION

Embodiments of the present disclosure provide technical solutions to technical challenges in existing environment scanning systems. The scanning systems can capture two-dimensional or three-dimensional (3D) scans. Such scans can include 2D maps, 3D point clouds, or a combination thereof. The scans can include additional components, such as annotations, images, textures, measurements, and other details.

Embodiments of the present disclosure facilitate a mobile scanning platform that allows for simultaneous scanning, mapping, and trajectory generation of an environment while the platform is moving. Embodiments of the present disclosure provide for a mobile scanning platform that may be used to scan an environment in an autonomous or semi-autonomous manner.

Typically, when capturing a scan of an environment, a version of the simultaneous localization and mapping (SLAM) algorithm is used. For completing such scans a scanner, such as the FARO® SCANPLAN®, FARO® SWIFT®, FARO® FREESTYLE®, or any other scanning system incrementally builds the scan of the environment, while the scanner is moving through the environment, and simultaneously the scanner tries to localize itself on this scan that is being generated. An example of a handheld scanner is described in U.S. patent application Ser. No. 15/713,931, the contents of which is incorporated by reference herein in its entirety. This type of scanner may also be combined with a another scanner, such as a time of flight scanner as is described in commonly owned U.S. patent application Ser. No. 16/567,575, the contents of which are incorporated by reference herein in its entirety. It should be noted that the scanners listed above are just examples and that the type of scanner used in one or more embodiments does not limit the features of the technical solutions described herein.

Figure 1:
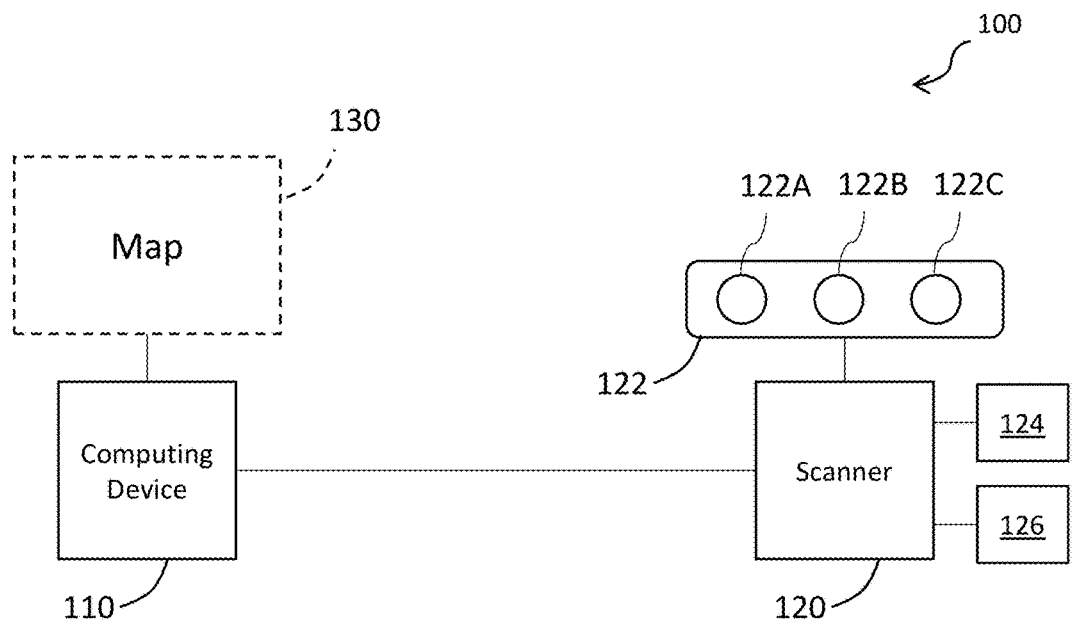
FIG. 1 depicts a system for scanning an environment according to one or more embodiments of the present disclosure.

FIG. 1 depicts a system for scanning an environment according to one or more embodiments of the present disclosure. The scanning system 100 includes a computing system 110 coupled with a scanner 120. The coupling facilitates wired and/or wireless communication between the computing system 110 and the scanner 120. The scanner 120 can include a 2D scanner, a 3D scanner, or a combination of both. The scanner 120 is capturing measurements of the surroundings of the scanner 120. The measurements are transmitted to the computing system 110 to generate a map 130 of the environment in which the scanner is being moved. The map 130 can be generated by combining several submaps. Each submap is generated using SLAM.

Figure 2:
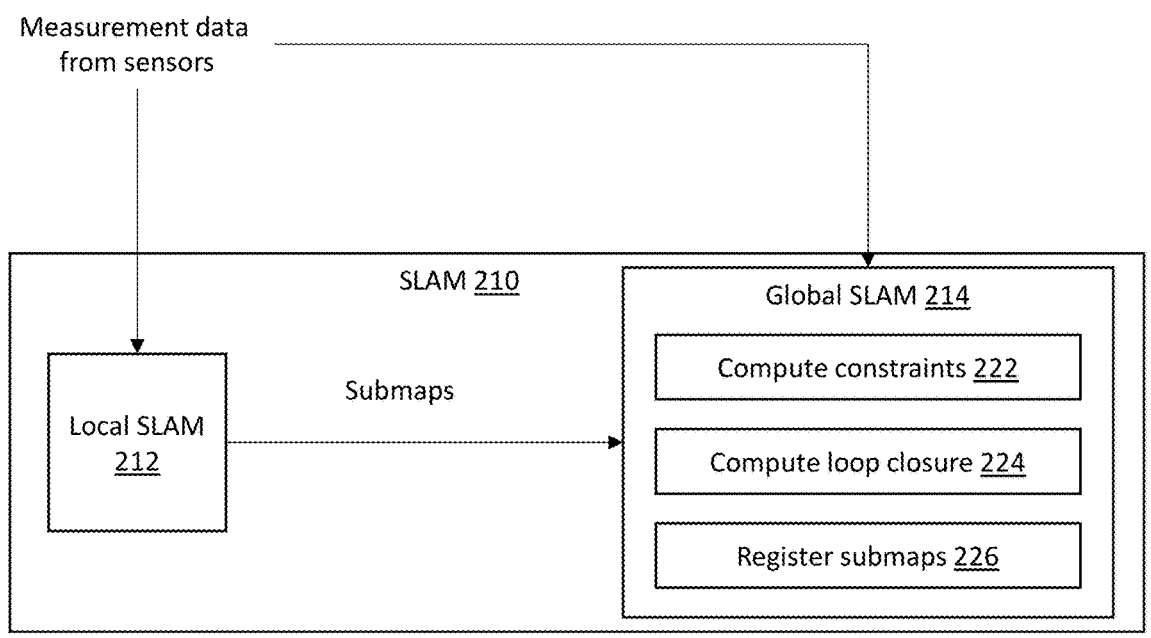
FIG. 2 depicts a flowchart of a method for using sensor data for simultaneously locating and mapping a scanner in an environment according to one or more embodiments of the present disclosure.

FIG. 2 depicts a high level operational flow for implementing SLAM according to one or more embodiments of the present disclosure. Implementing SLAM 210 includes generating one or more submaps corresponding to one or more portions of the environment. The submaps are generated using the one or more sets of measurements from the sets of sensors 122. Generating the submaps may be referred to as "local SLAM" (212). The submaps are further combined by the SLAM algorithm to generate the map 130. Combining the submaps process may be referred to as "global SLAM" (214). Together, generating the submaps and the final map 130 of the environment is referred to herein as implementing SLAM, unless specifically indicated otherwise.

It should be noted that the operations shown in FIG. 2 are at high level, and that typical implementations of SLAM 210 can include operations such as filtering, sampling, and others, which are not depicted.

The local SLAM 212 facilitates inserting a new set of measurement data captured by the scanner 120 into a submap construction. This operation is sometimes referred to as "scan matching." A set of measurements can include one or more point clouds, distance of each point in the point cloud(s) from the scanner 120, color information at each point, radiance information at each point, and other such sensor data captured by the set of sensors 122 that is equipped on the scanner 120. For example, the sensors 122 can include a LIDAR 122A, a depth camera 122B, a camera 122C, etc. The scanner 120 can also include an inertial measurement unit (IMU) 126 to keep track of a 3D orientation of the scanner 120.

The captured measurement data is inserted into the submap using an estimated pose of the scanner 120. The pose can be extrapolated by using the sensor data from sensors 122, the IMU 126, and/or from sensors besides the range finders to predict where the scanned measurement data is to be inserted into the submap. Various techniques are available for scan matching. For example, a point to insert the measured data can be determined by interpolating the sub-map and sub-pixel aligning the scan. Alternatively, the measured data is matched against the submap to determine the point of insertion. A submap is considered as complete when the local SLAM 212 has received at least a predetermined amount of measurement data. Local SLAM 212 drifts over time, and global SLAM 214 is used to fix this drift.

It should be noted that a submap is a representation of a portion of the environment and that the map 130 of the environment includes several such submaps "stitched" together. Stitching the maps together includes determining one or more landmarks on each submap that is captured and aligning and registering the submaps with each other to generate the map 130. In turn, generating each submap includes combining or stitching one or more sets of measurements from the sensors 122. Combining two sets of measurements requires matching, or registering one or more landmarks in the sets of measurements being combined.

Accordingly, generating each submap and further combining the submaps includes registering a set of measurements with another set of measurements during the local SLAM (212), and further, generating the map 130 includes registering a submap with another submap during the global SLAM (214). In both cases, the registration is done using one or more landmarks.

Here, a "landmark" is a feature that can be detected in the captured measurements, and which can be used to register a point from the first set of measurements with a point from the second set of measurements. For example, the landmark can facilitate registering a 3D point cloud with another 3D point cloud or to register an image with another image. Here, the registration can be done by detecting the same landmark in the two measurements (images, point clouds, etc.) that are to be registered with each other. A landmark can include, but is not limited to features such as a doorknob, a door, a lamp, a fire extinguisher, or any other such identification mark that is not moved during the scanning of the environment. The landmarks can also include stairs, windows, decorative items (e.g., plant, picture-frame, etc.), furniture, or any other such structural or stationary objects. In addition to such "naturally" occurring features, i.e., features that are already present in the environment being scanned, landmarks can also include "artificial" landmarks that are added by the operator of the scanner 120. Such artificial landmarks can include identification marks that can be reliably captured and used by the scanner 120. Examples of artificial landmarks can include predetermined markers, such as labels of known dimensions and patterns, e.g., a checkerboard pattern, a target sign, or other such preconfigured markers.

The global SLAM (214) can be described as a pose graph optimization problem. As noted earlier, the SLAM algorithm is used to provide concurrent construction of a model of the environment (the scan), and an estimation of the state of the scanner 120 moving within the environment. In other words, SLAM gives you a way to track the location of a robot in the world in real-time and identify the locations of landmarks such as buildings, trees, rocks, walls, doors, windows, paintings, decor, furniture, and other world features. In addition to localization, SLAM also builds up a model of the environment to locate objects including the landmarks that surround the scanner 120 and so that the scan data can be used to ensure that the scanner 120 is on the right path as the scanner 120 moves through the world, i.e., environment. So, the technical challenge with the implementation of SLAM is that while building the scan, the scanner 120 itself might lose track of where it is by virtue of its motion uncertainty because there is no presence of an existing map of the environment (the map is being generated simultaneously).

The basis for SLAM is to gather information from the set of sensors 120 and motions over time and then use information about measurements and motion to reconstruct a map of the environment. The SLAM algorithm defines the probabilities of the scanner 120 being at a certain location in the environment, i.e., at certain coordinates, using a sequence of constraints. For example, consider that the scanner 120 moves in some environment, the SLAM algorithm is input the initial location of the scanner 120, say (0,0) initially, which is also called as Initial Constraints. The SLAM algorithm is then provided with several relative constraints that relate each pose of the scanner 120 to a previous pose of the scanner 120. Such constraints are also referred to as relative motion constraints.

The technical challenge of SLAM can also be described as follows. Consider that the scanner is moving in an unknown environment, along a trajectory described by the sequence of random variables $x_{1:T}=\{x_1, \ldots, x_T\}$. While moving, the scanner acquires a sequence of odometry measurements $u_{1:T}=\{u_1, \ldots, u_T\}$ and perceptions of the environment $z_{1:T}=\{z_1, \ldots, z_T\}$. The "perceptions" include the captured data and the mapped detected planes 410. Solving the full SLAM problem now includes estimating the posterior probability of the trajectory of the scanner 120 $x_{1:T}$ and the map M of the environment given all the measurements plus an initial position $x_0$: $P(x_{1:T}, M|z_{1:T}, u_{1:T}, x_0)$. The initial position $x_0$ defines the position in the map and can be chosen arbitrarily. There are several known approaches to implement SLAM, for example, graph SLAM, multi-level relaxation SLAM, sparse matrix-based SLAM, hierarchical SLAM, etc. The technical solutions described herein are applicable regardless of which technique is used to implement SLAM.

Figure 3:
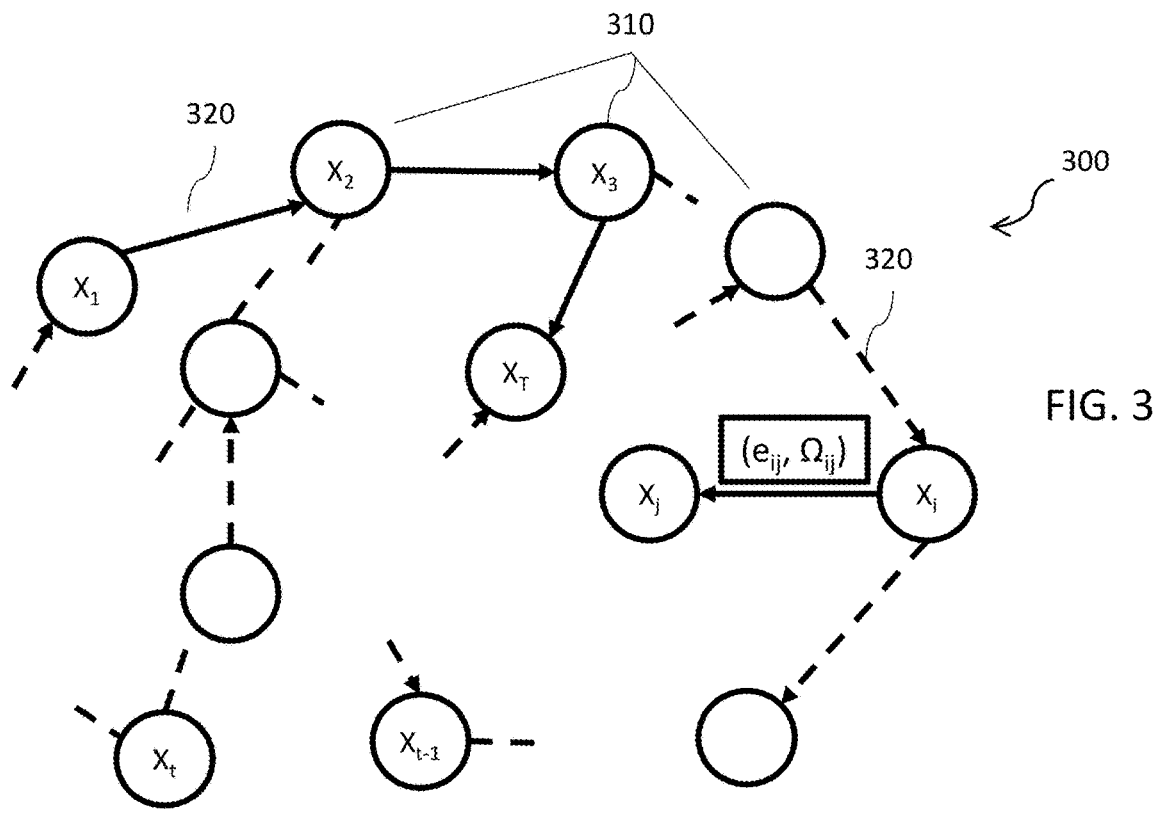
FIG. 3 depicts a graphical representation of an example SLAM implementation.

FIG. 3 depicts a graphical representation of an example SLAM implementation. In the depicted representation of the SLAM as a graph 300, every node 310 corresponds to a pose of the scanner 120. Nearby poses are connected by edges 320 that model spatial constraints between poses of the scanner 120 arising from measurements. Edges $e_{t-1, t}$ between consecutive poses model odometry measurements, while the other edges represent spatial constraints arising from multiple observations of the same part of the environment.

A graph-based SLAM approach constructs a simplified estimation problem by abstracting the raw sensor measurements. These raw measurements are replaced by the edges 320 in graph 300, which can then be seen as "virtual measurements." An edge 320 between two nodes 310 are labeled with a probability distribution over the relative locations of the two poses, conditioned to their mutual measurements. In general, the observation model $P(z_t|x_t, M_t)$ is multi-modal, and therefore the Gaussian assumption does not hold. This means that a single observation $z_t$ might result in multiple potential edges connecting different poses in the graph, and the graph connectivity needs itself to be described as a probability distribution. Directly dealing with this multi-modality in the estimation process would lead to a combinatorial explosion of complexity. As a result of that, most practical approaches restrict the estimate to the most likely topology. Hence, a constraint resulting from observation has to be determined.

If the observations are affected by (locally) Gaussian noise and the data association is known, the goal of a graph-based mapping algorithm is to compute a Gaussian approximation of the posterior over the trajectory of the scanner 120. This involves computing the mean of this Gaussian as the configuration of the nodes 310 that maximizes the likelihood of the observations. Once the mean is known, the information matrix of the Gaussian can be obtained in a straightforward fashion, as is known in the art. In the following, we will characterize the task of finding this maximum as a constraint optimization problem.

Let $x=(x_1, \ldots, x_T)^T$ be a vector of parameters, where $x_i$ describes the pose of node i. Let $z_{ij}$ and $\Omega_{ij}$ be respectively the mean and the information matrix of a virtual measurement between the node i and the node j. This virtual measurement is a transformation that makes the observations acquired from i maximally overlap with the observation acquired from j. Further, let $\hat{z}_{ij}(x_i, x_j)$ be the prediction of a virtual measurement given a configuration of the nodes $x_i$ and $x_j$. Usually, this prediction is the relative transformation between the two nodes. Let $e(x_i, x_j, z_{ij})$ be a function that computes a difference between the expected observation $\hat{z}_{ij}$ and the real observation $z_{ij}$ captured by the scanner 120. For simplicity of notation, the indices of the measurement are encoded in the indices of the error function: $e_{ij}(x_i, x_j)=z_{ij}-\hat{z}_{ij}(x_i, x_j)$.

If C is the set of pairs of indices for which a constraint (observation) z exists, the goal of a maximum likelihood approach is to find the configuration of the nodes x* that minimizes the negative log-likelihood F(x) of all the observations: $F(x)=\Sigma_{(i,j)\in c} F_{ij}$, where $F_{ij}=e_{ij}^T\Omega_{ij}e_{ij}$. Accordingly, implementing SLAM includes solving the following equation and computing a Gaussian approximation of the posterior over the trajectory of the scanner 120: $x^*=\text{argmin}_x F(x)$.

Several techniques are known for solving the above equations, for example, using Gauss-Newton or the Levenberg-Marquardt algorithms. The technical solutions provided by one or more embodiments of the present disclosure can be used regardless of how the SLAM algorithm is implemented, i.e., regardless of how the above equations are solved. The technical solutions described herein provide the set of constraints C that is used for implementing the SLAM algorithm, using whichever technique is to be used.

Accordingly, implementing global SLAM 214 includes determining constraints (222) between nodes 320, i.e., submaps, objects, landmarks, or any other elements that are matched. Non-global constraints (also known as inter submaps constraints) are built automatically between nodes 310 that are closely following each other on a trajectory of the scanner 120 in the environment. Global constraints (also referred to as loop closure constraints or intra submaps constraints) are constraints between a new submap and previous nodes 310 that are considered "close enough" in space and a strong fit, i.e., a good match when running scan matching. Here, "close enough" is based on predetermined thresholds, for example, distance between the same landmark from two submaps being within a predetermined threshold.

For example, existing implementations of SLAM use measurements, such as LIDAR data, from the set of sensors 122, to aggregate the measurements to generate the submaps and eventually the map 130. A technical challenge with such implementations is that the matching of the sets of measurements is inaccurate due to ambiguities or missing data. This may lead to misaligned sets of measurements and/or submaps, which in turn, cause an erroneous submap and/or map 130. Typically, "loop closure" 224 is used to prevent such errors by compensating for accumulated errors. However, because of missing data or ambiguities in the data that is collected, the result of the SLAM implementation can be adversely affected by missing loop closure and/or by drift. A "missing loop closure" indicates that during execution of the global SLAM 214, a loop closure 224 is not deemed necessary based on the constraints and/or the measurement data that is received. Alternatively, the drift from the measurement data is larger than a predetermined threshold, and hence, is not compensated by the loop closure 224. Accordingly, registering the submaps 226 can result in misaligned submaps.

To address the technical challenges with the misaligned submaps, embodiments described herein provide, an operator of the scanner 120, control over correcting an error during runtime, when the operator notices a drift of position or missing loop closure. In one or more embodiments, the scanner 120 provides a graphical user-interface (GUI) for the operator to match a current position or any other portion from the present scan with a known point in the map 130.

The known point can be a landmark, and in some embodiments, a user-identifiable landmark. For example, the known point can be a feature, such as, a corner with a 90-degree angle, walls with a particular length, pillars with a defined shape that can be defined using geometry primitives like a circle. Alternatively, the known point can be a "scan position," i.e., a position of the scanner 120 in the environment from which measurements are captured.

Figure 4:
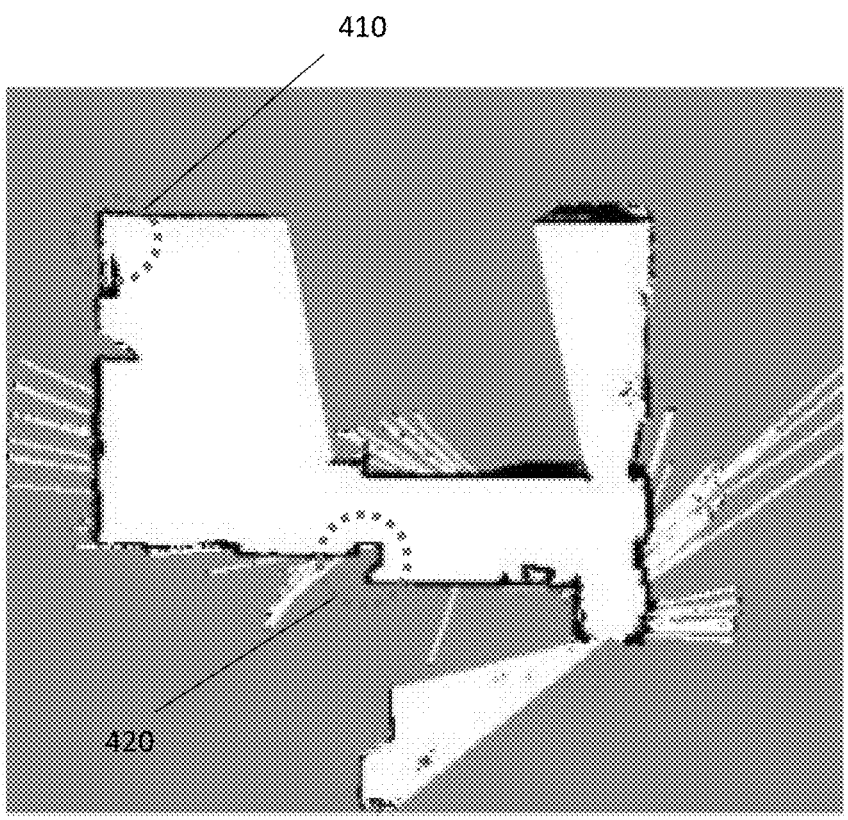
FIG. 4 depicts example features detected according to one or more embodiments of the present disclosure.

FIG. 4 depicts example features or portions of the environment that can be noted and used by the operator to facilitate aligning one or more submaps according to one or more embodiments of the present disclosure. The features can include a corner 410, a door 420, or any other such landmark that the operator can identify as being misplaced when looking at a scan that is captured by the scanner 120 in real time, and at runtime. Here, a "scan" can be a set of measurement data, where multiple such scans are combined to form a submap, and where several such submaps are combined to form the map 130.

If the same features are detected in multiple scans, the feature is used as a constraint for matching of the multiple scans during the local SLAM 212. The features are also used for initialization to generate submaps consisting of multiple matched data. This matching maybe implemented as nonlinear optimization with a cost function. In one or more embodiments of the present disclosure, the cost function can include equations for the distance of the semantic features from the scanner 120 to improve the accuracy and robustness of the SLAM algorithm (210). Further, in one or more embodiments of the present disclosure, the features can be used in some situations to improve the robustness and speed of optimization during initialization of the SLAM algorithm (210).

Additionally, the features can be reused as indicator for loop closure in the case where the feature which can be identified globally e.g., line/wall segments through their length. If multiple such landmarks are identified between two submaps the loop closure can be evaluated using the timestamp and the features for the alignment of the multiple submaps.

Figure 5:
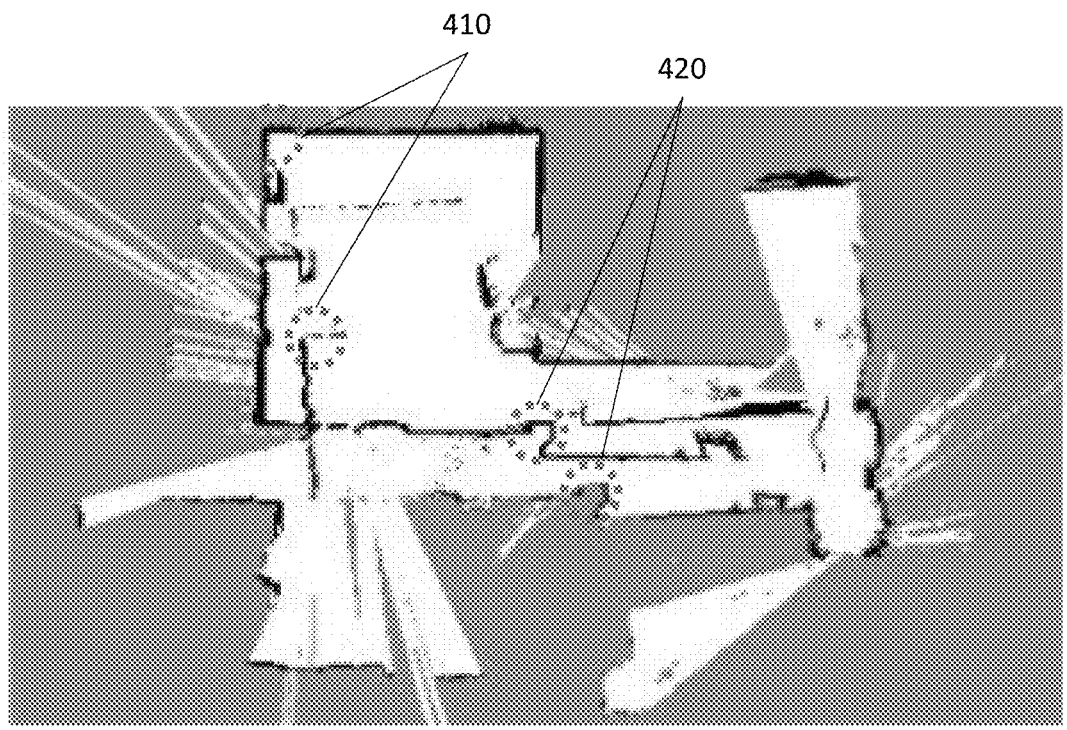
FIG. 5 depicts an example of improving loop closure using features according to one or more embodiments of the present disclosure.

FIG. 5 depicts an example of improving loop closure using features according to one or more embodiments of the present disclosure. As shown, the same features, the corner 410, and the door 420, are detected in two submaps. The features can be used for aligning the two submaps when generating the map 130. The features can be used to create a constraint for such alignment.

Figure 6:
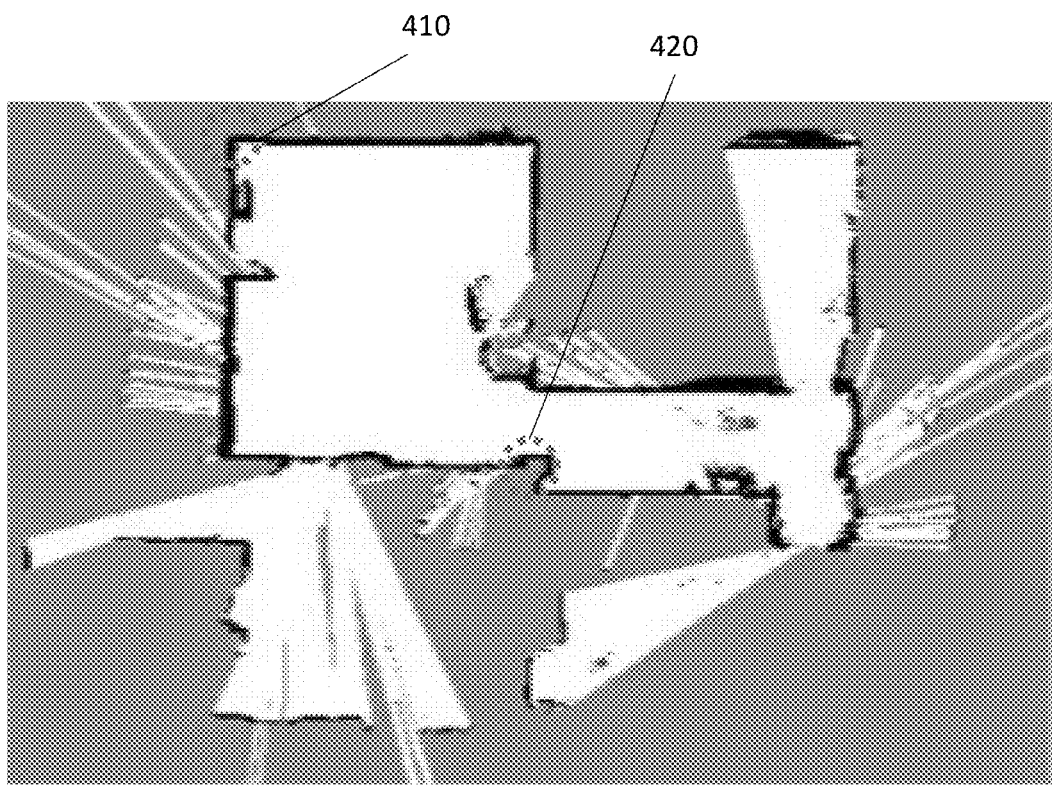
FIG. 6 depicts a result of an alignment using features that are detected according to one or more embodiments of the present disclosure.

FIG. 6 depicts a result of an alignment using semantic features that are detected according to one or more embodiments of the present disclosure. As can be seen, the submaps and the features, for example, the corner 410, and the door 420, are aligned better compared to the misalignment in FIG. 5.

The features can also be used in the global SLAM 214 optimization as constraints for the connection between the submaps and the orientation of the scanner 120.

Once the loop closure 224 is completed, the global SLAM 214 is completed by registering 226 the submaps and stitching the submaps to generate the map 130. In one or more embodiments of the present disclosure, SLAM 210 is performed iteratively as newer measurements are acquired by the scanner 120.

Referring to FIG. 1 again, the computing system 110 can be a desktop computer, a laptop computer, a tablet computer, a phone, or any other type of computing device that can communicate with the scanner 120.

One or more operations for implementing SLAM can be performed by the computing system 110. Alternatively, or in addition, one or more of the operations can be performed by a processor 124 that is equipped on the scanner 120. In one or more embodiments of the present disclosure, the processor 124 and the computing system 110 can implement SLAM in a distributed manner. The processor 124 can include one or more processing units. The processor 124 controls the measurements performed using the set of sensors 122. In one or more examples, the measurements are performed based on one or more instructions received from the computing system 110.

In one or more embodiments of the present disclosure, the computing device 110 and/or a display (not shown) of the scanner 120 provides a live view of the map 130 of the environment being scanned by the scanner 120 using the set of sensors 122. Map 130 can be a 2D or 3D representation of the environment seen through the different sensors. Map 130 can be represented internally as a grid map. A grid map is a 2D or 3D arranged collection of cells, representing an area of the environment. In one or more embodiments of the present disclosure, the grid map stores for every cell, a probability indicating if the cell area is occupied or not. Other representations of the map 130 can be used in one or more embodiments of the present disclosure.

As noted earlier, the scanner 120, along with capturing the map 130, is also locating itself within the environment. The scanner 120 uses odometry, which includes using data from motion or visual sensors to estimate the change in position of the scanner 120 over time. Odometry is used to estimate the position of the scanner 120 relative to a starting location. This method is sensitive to errors due to the integration of velocity measurements over time to give position estimates.

It should be noted that the implementation of the SLAM, local and global, itself is known, and also that embodiments of the present disclosure provide accurate data that can be used by such an implementation to provide an improved result of the SLAM implementation. The embodiments of the present disclosure, accordingly, facilitate improvement to computing technology. Further, embodiments of the present disclosure provide a practical application that facilitates generating the map 130 of an environment.

Figure 7:
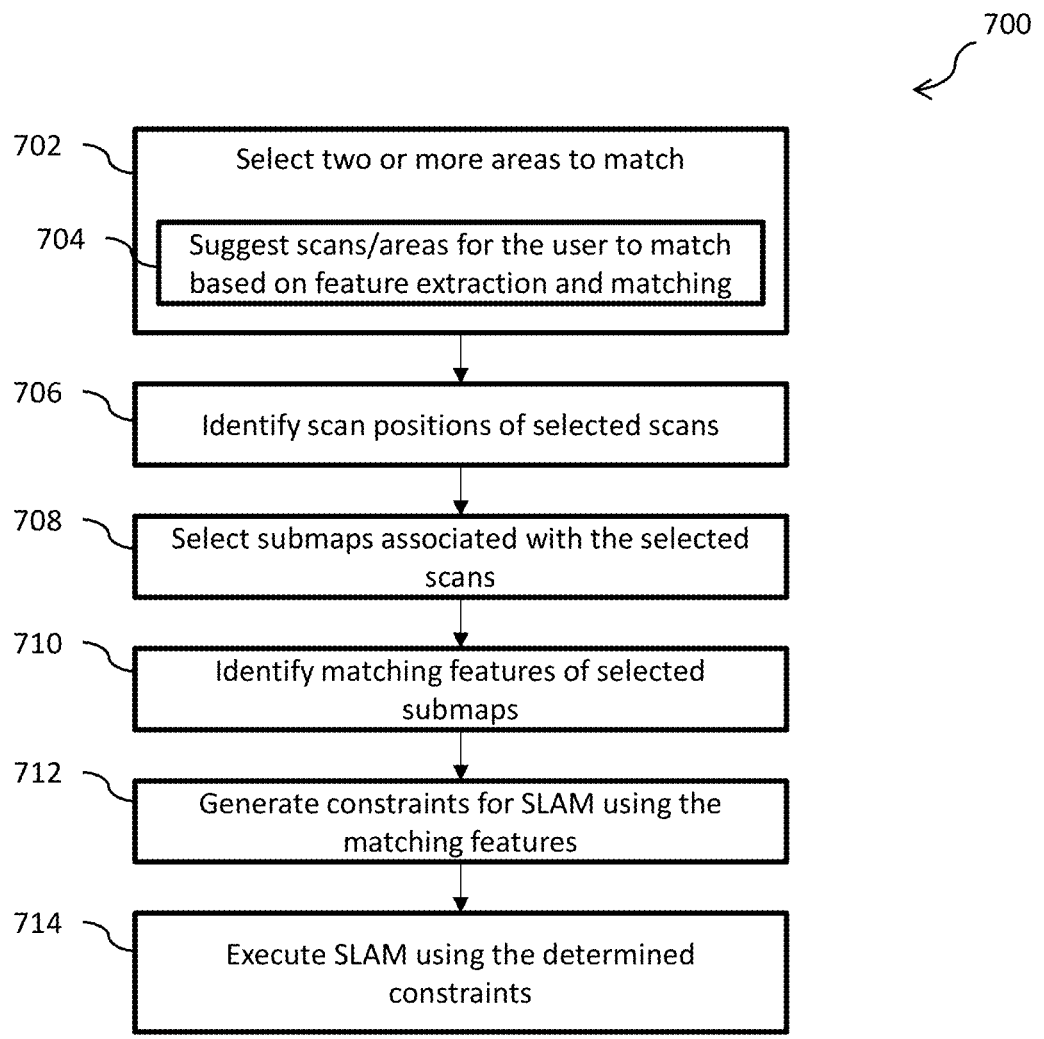
FIG. 7 depicts a flowchart of a method for the operator to correct alignment of one or more scans at runtime during scanning the environment according to one or more embodiment.

FIG. 7 depicts a flowchart of a method for the operator to correct alignment of one or more scans at runtime during scanning the environment according to one or more embodiments. In one or more embodiments, to facilitate the operator to correct the alignment of one or submaps, the scanning system 100 provides the operator a user-interface to choose connections between one or more positions/areas in the scans. The workflow for the operator, according to a method 700 depicted in FIG. 7 includes, at block 702, the operator selecting (e.g., using a mouse, keyboard, touchscreen, or any other input device) two areas to match. In an embodiment, one of the selections can be a an area in a previously captured scan, and the other is the area that is being presently scanned. Alternatively, the operator can select two areas from two previous scans.

In an embodiment, the selection can include drawing an outline to mark a particular area in the previous scan. In another embodiment, the selection can include selecting the entire scan. In one or more embodiments, selecting an area includes selecting a submap generated by the local SLAM 212 that includes the scan associated with the selected area.

The selection and other such interactions in the method 700 can be performed via the scanner 120 and/or via the computing system 110. The scanner 120 and the computing system 110 provide a user-interface for such interactions.

In one or more embodiments, at block 704, the scanning system 100, via the user-interface suggests areas and/or scans that share one or more similarities. The operator can then select scans or areas from the suggestions (or from other scans that are not suggested). The suggestions can be provided by the scanning system 100 performing a feature extraction and feature matching on one or more of the scans, including the present scan. The scans that have at least a predetermined number of matching features are suggested to the operator. The operator can inspect the suggested scans to determine if they include areas that can be aligned to improve the result of the SLAM 210.

In one or more embodiments, the scanning system 100 identifies the one or more scans suggested to the operator based on landmarks or image features. For example, once a submap is generated by the local SLAM 212, the scanning system 100 extracts one or more features from that submap. The extracted features can include landmarks. Alternatively, in one or more embodiments, the submap is transformed into an image and image feature extraction algorithms like Harris corner, SIFT/SURF, or any other such algorithms are used to extract one or more features from the image.

Additionally, in one or more embodiments, the operator, at the time of scanning can mark particular landmarks or features with descriptors by annotating the scans (at runtime, or offline). For example, the operator can identify landmarks such as door 420, corner 410, or any other such items in the environment. The annotations can be performed for other reasons, such as identifying locations of particular items in the environment. The feature extraction algorithms can use these feature descriptors from the image/submap to locate the features and identify the scans that include these known features. Such scans that include the same annotations can be suggested to the operator for selection. In one or more embodiments, upon selection of a feature in the present scan-data, at runtime, the scanning system 100 displays, to the operator, via the user-interface, a list of submaps that include the same feature.

When the operator selects two scans/areas to be matching, at block 706, the scanning system 100 identifies the scanning position from which the scans/areas were captured. The scanning system 100 keeps a record of the scanning position from which each scan was captured. At block 708, the scanning system 100 searches for and identifies the underlying submap(s) that include the area that was selected by the operator. In one or more embodiments, the scanning system 100 also selects submaps that are adjacent to the selected area. As described earlier, the scanning system 100 has already extracted features and descriptors for each submap after the local SLAM 212. The features of the selected submaps are compared and matched to identify matching features from the selected submaps, at block 710. A matching feature can include a particular point in space, a landmark, a set of points or any other such elements from the scan/submap.

In one or more embodiments, to "match features" includes determining that the features in question have the same 3D coordinates in the coordinate system of the environment, i.e., the map 130, and that the features in question are the same feature. The 3D coordinates are determined based on the point cloud(s) that are captured by the scanner 120. A particular feature should have substantially the same 3D coordinates in each scan/submap. Based on the matching of the features in this manner the scanning system 100 can generate constraints for the SLAM algorithm 210, at block 712. The constraints specify that the matching features have to have the same coordinates, which, in turn, dictates the orientation of the rest of the scan/submap. The constraints are input to the global SLAM algorithm 210 to be in the optimization. Adding such a constraint triggers the SLAM optimization to detect a missing loop closure and, in turn align the underlying submaps. Accordingly, the method 700 includes executing the SLAM 210 using the determined constraints, at block 714.

To improve robustness of matching the features, in one or more embodiments, outliers of the features that match are filtered using known algorithms such as random sample consensus (RANSAC) for Euclidean transformation estimation between the subset of the matches. Other outlier filtering algorithms can also be used in other embodiments.

Figure 8:
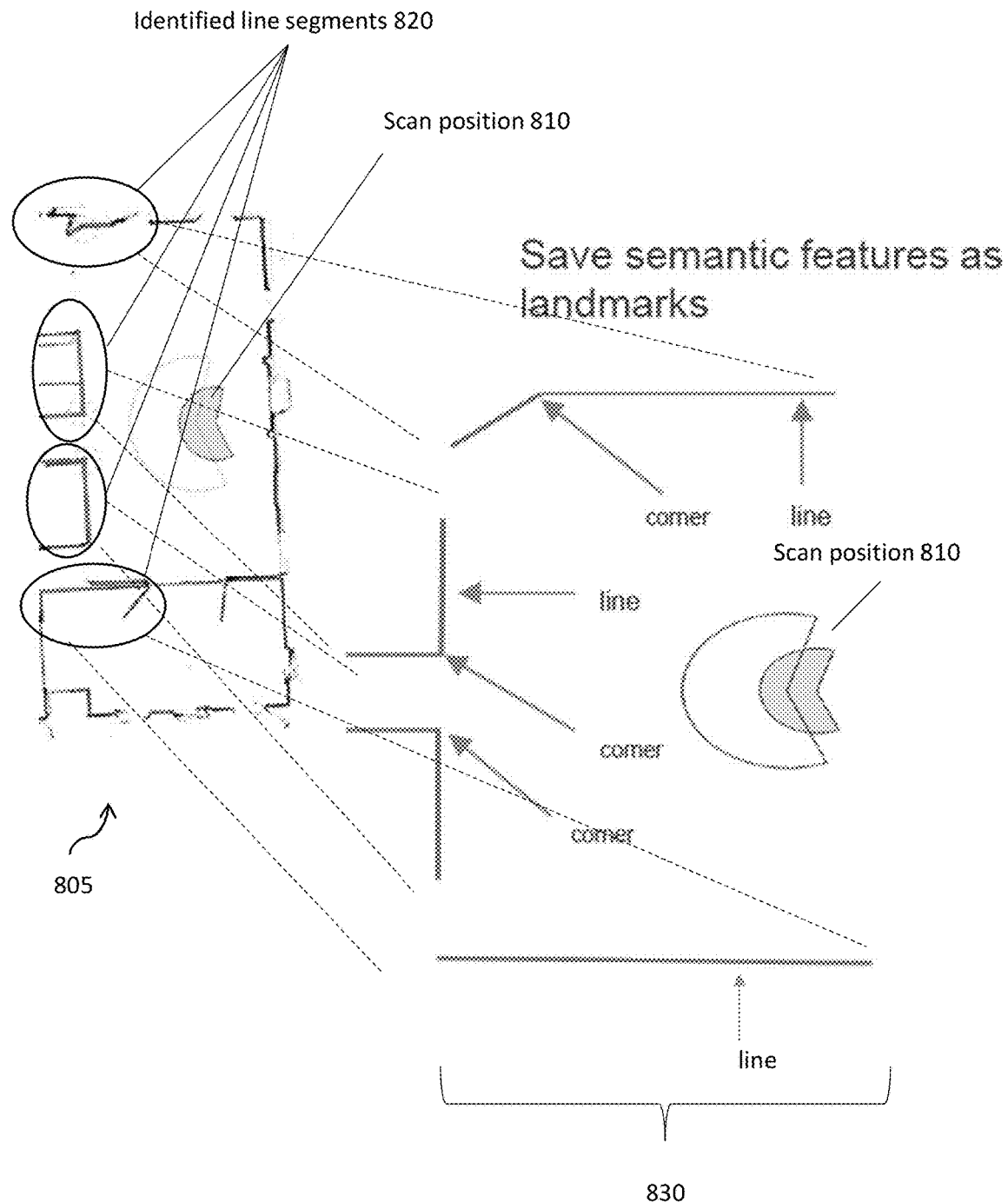
FIG. 8 depicts an example scenario where features are detected according to one or more embodiments of the present disclosure.

FIG. 8 depicts an example scenario where features are detected according to one or more embodiments of the present disclosure. For each scan 805, the scanner position 810 and a timestamp is recorded along with the captured measurement data. The line-segments 820 of at least the predetermined length are identified from the scan 805. The features 830 are determined from the identified line-segments 820. The features 830 are automatically detected in one or more embodiments of the present disclosure. In one or more embodiments of the present disclosure, the operator can manually select a subset of the features 830 that are automatically detected, the selected features being used as the landmarks. The selected features are assigned unique identifiers in one or more embodiments.

The operations of detecting the features 830 is repeated in every new submap that results from the local SLAM 212. In one or more embodiments of the present disclosure, along with assigning the unique identifier to each feature, the submap that is generated is also annotated with the information of the feature.

Figure 9:
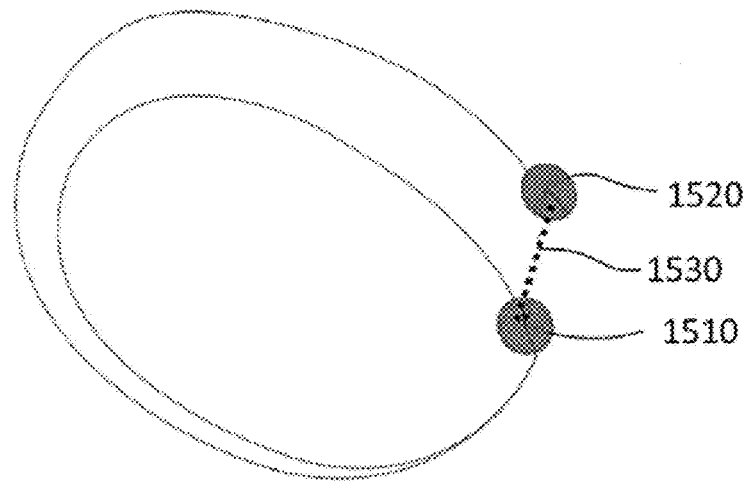
FIG. 9 schematically illustrates an example scenario in which an offset is continuously introduced into the scan data.

FIG. 9 schematically illustrates an example scenario in which an offset (referred to as "drift") is continuously introduced into the scan data. Consider that the scanner 120 is moving from a starting position 1510 (real pose). After some movements the scanner 120 is designated to return to an already mapped region, such as the starting position 1510, however the measured position due to sensor variation and the subsequent measurement error is a different position 1520 (estimated pose). The loop closure algorithm(s) that are typically used detect the loop closure correction 1530 and corrects the pose and the submaps/scans that have been acquired so far by the scanner 120. As a consequence all positions in the map 130, including the scan positions 810, the registration points, and the points scanned and stored in the scans, change their coordinates based on the loop closure correction 1530. In a pure mapping application this may not introduce inefficiencies or other issues, however for the scanner 120 that uses scans from different scan positions, such a change in map coordinates leads to errors/inefficiencies because the scan positions are recorded before they are not automatically adapted in this manner.

Figure 10:
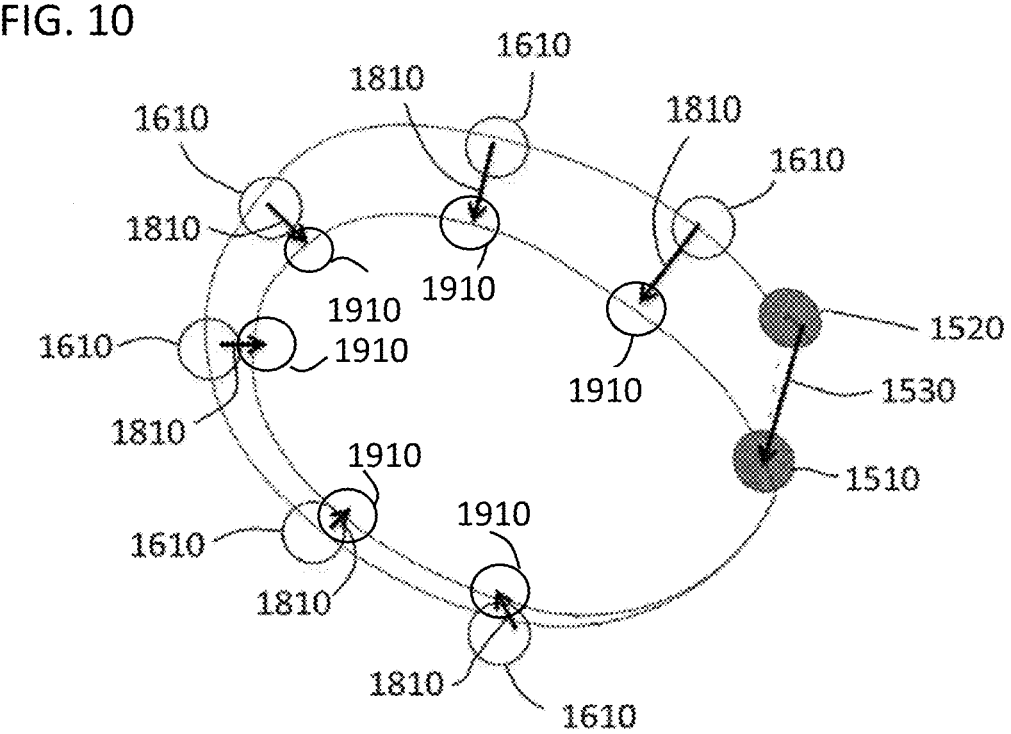
FIG. 10 illustrates the accumulation of errors and inefficiencies in an example scenario.

For example, FIG. 10 illustrates the accumulation of errors and inefficiencies. The scanner 120 starts moving from the start position 1510. After some movement the scanner 120 takes a scan as described herein from one of a plurality of scan positions 1610. When the scanner 120 arrives back in the start position 1510 the measurement error due to sensor data variance causes the estimated pose 1520 to differ from the start position 1510. After loop closure the recorded scan positions still have the same coordinates including the error while the map 130 was corrected by the loop closure algorithm. Consequently the estimated positions of the scans have a deviation. As described earlier, when the loop closure is applied all positions in the map 130 change. But as the scan positions 1610 have been recorded before, the scan positions are not automatically adapted. As a consequence there are offsets between the scan positions 1610 and the map 130 acquired by the scanner 120. The error in a scan position and consequently the error of distance in the generated maps accumulates as the scanner 120 is used. Accordingly, the longer the path taken by the scanner 120, the larger the error(s) in the scan positions. By using a registration process (such as Cloud2Cloud registration for example) for the scans the errors in the scan positions 1610 can be corrected in the measurement data. However, such registration process requires additional processing power and time, which is inefficient.

Accordingly, the loop closure can be performed using the landmarks that are detected using the features 830 as described herein. The relative observation of a landmark from the scanner 120 delivers an accurate position information and can correct the position of the scanner 120 in the absolute world and remove absolute inaccuracies accumulated from the mapping process. The more landmarks (observed with a good accuracy) the better the position accuracy of the scanner 120 and consequently the absolute accuracy of the maps scanned by the scanner 120. It should be noted that as used herein, "absolute accuracy" is the accuracy of measurements of a map that is scanned compared to a ground truth. For example, a side wall of a building has a real length of 100 m. The side wall when measured by the scanner 120 is 101.1 m. In this case, there is an absolute error of 1.1 m and an absolute accuracy of >1.1 for distance >100 m. Such kind of errors in the scan positions are mitigated using loop closure.

Figure 11:
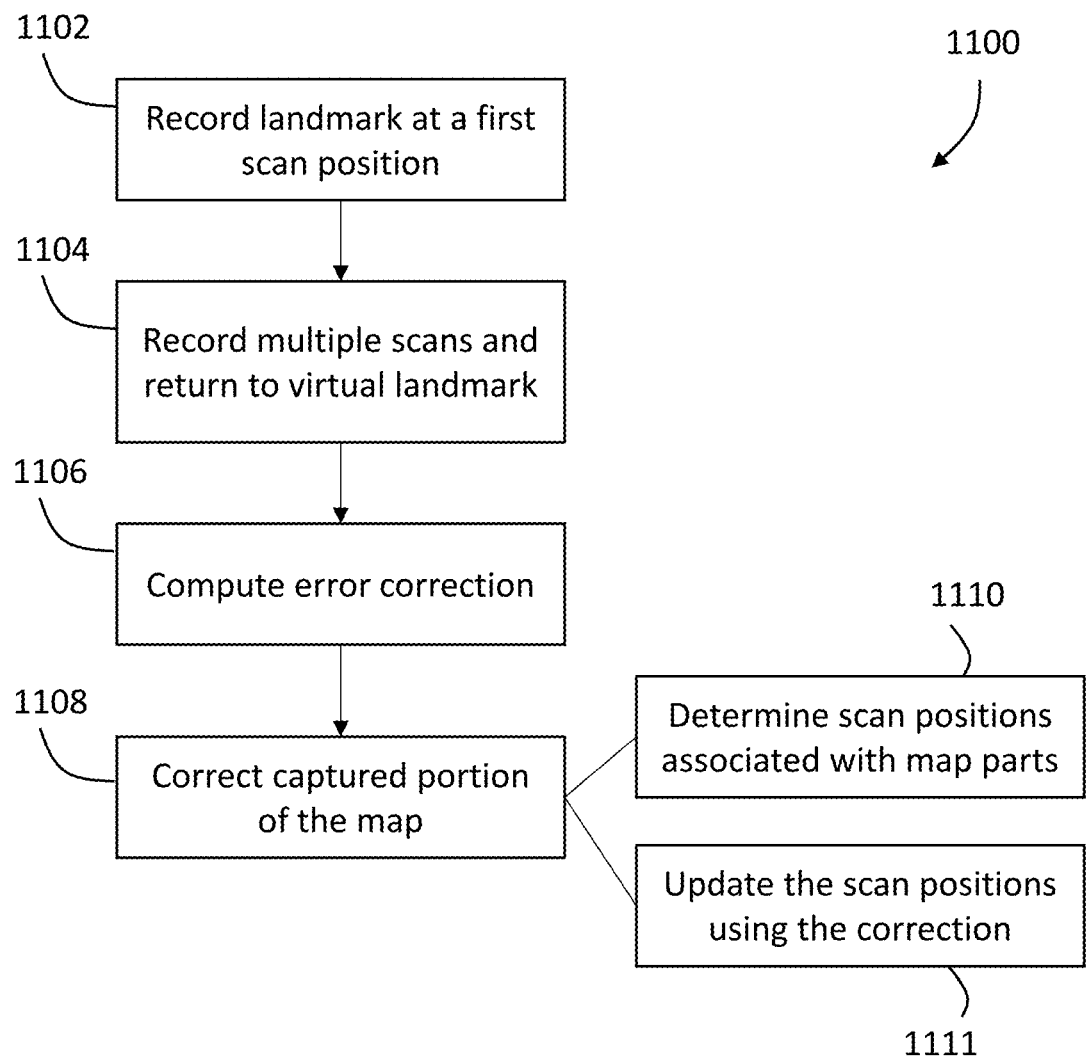
FIG. 11 depicts an example method for correcting scan positions using landmarks from features while performing a scan according to one or more embodiments.

FIG. 11 depicts an example method 1100 for correcting scan positions using landmarks from semantic features while performing a scan according to one or more embodiments. In one or more examples, the operator stops and starts to record a scan 805 with the scanner 120 at a scan position 810 from the scan positions 1610 (FIG. 10). In another embodiment, the scanner 120 automatically stops and starts to record the scan 805 at the scan position 1610. Acquiring the scan 805 includes determining with processor system, in cooperation with the scanner 120, 3D coordinates of a first collection of points on an object surface while the scanner is located at a first registration position (e.g. position 1510) while the moveable platform moves through the environment. Further, acquiring the scan 805 includes obtaining by the scanner 120 in cooperation with the processor system a plurality of 2D scan sets. Each of the plurality of 2D scan sets is a set of 2D coordinates of points on the object surface collected as the scanner 120 moves from the first registration position (1510) to a second registration position (e.g. position 1610). Each of the plurality of 2D scan sets is collected by the scanner 120 at a different position relative to the first registration position 1510. The plurality of the 2D scan sets are together referred to as a 2D map and each of the scan sets is a part of the map 130.

Figure 12:
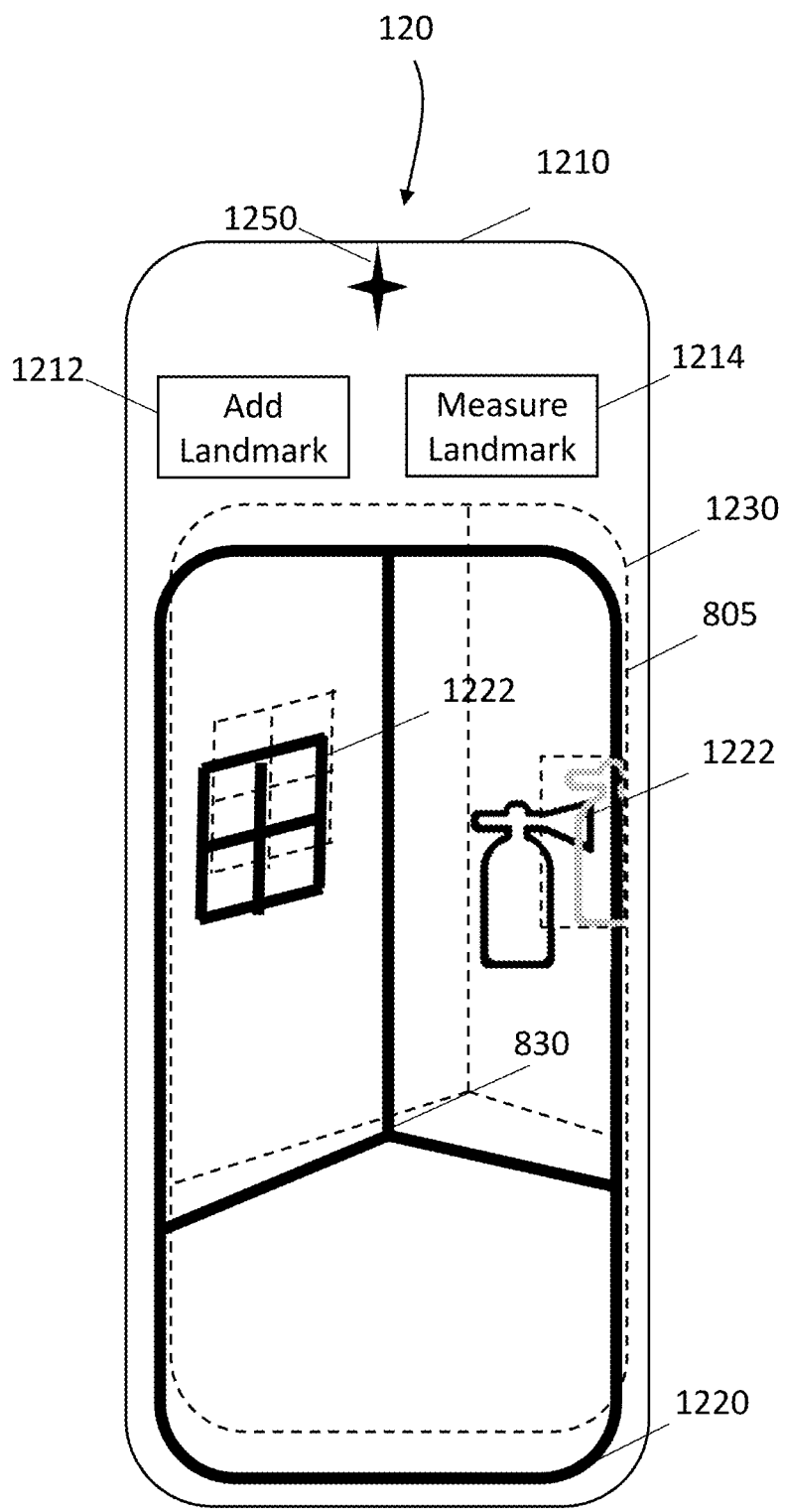
FIG. 12 is a view of a user-interface of a scanner in accordance with an embodiment.

Referring now to the flowchart in FIG. 11, one or more features 830 are recorded as landmarks when the scanner is at a first scan position 1510, at block 1102. The features are detected, automatically, semi-automatically, or manually. For example, the operator can select "add landmark" 1212 (FIG. 12) via a user-interface 1210 of the scanner 120. The operator captures the scan 805 from the present scan position 1510. Alternatively, or in addition, the scan 805 is automatically captured by the scanner 120 in response to an instruction executed by the controller. The scan 805 is saved as complementary data with the scan position 1510 and the scan position 1510 is marked to indicate that it is a landmark. In one or more examples, the landmark is represented as a flag (or any other marker) in the map 130. The present scan position 1510 of the scanner is recorded as part of the landmark.

In one or more examples, the scan 805 is captured to include specific features 830 in the environment. In addition, the scan 805 is captured to include specific objects 1222 in the environment that are relatively immovable, and that can be used as reference objects at a future time when the scanner 120 returns to the scan position 1510. For example, the scan 805 includes objects 1222 that are identifiable and that facilitate the operator to recognize that the scanner 120 is at substantially the same position (1510) when the scanner 120 returns after mapping. For example, the identifiable objects 1222 can include construction items such as windows, doors, corners, pillars, beams, and the like. Alternatively, or in addition, the identifiable objects 1222 can include items that have a relatively immovable position, such as a fire extinguisher (which may be required at particular position because of regulations/code), a defibrillator, a statue, a water fountain, a plant, and the like.

In one or more examples, the scanner 120 detects the identifiable objects 1222 and features 830 in the environment as the mapping is being performed. For example, the scanner 120 is preconfigured with a list of identifiable objects 1222 and features 830 that can be present in the environment. The scanner 120 performs an object and feature recognition in the field of view as the platform is being moved. If any one or more of the objects and features from the list is detected in the field of view, the scanner 120 notifies the operator that a landmark can be recorded a the present scan position. For example, a visual notification 1250 is shown on the user-interface 1210. The visual notification can be a popup, a dropdown, a flashing light, or any other type of visual notification. Alternatively, or in addition, the notification can include an audio notification, a haptic notification, or any other type of notification to suggest the operator that the present position 1510 can be used as a virtual landmark.

The scanner 120 continues to capture scans 805 at multiple other scan positions 1610 and returns to the first scan position, at block 1104. Capturing the present position procedure is repeated for every scan 805 captured by the scanner 120. For example, if the scanner 120 captures n scans a data structure holds n positions with n links to the corresponding measurement data of the portion scanned. In one or more examples, the scanner 120 saves the present position in a data structure such as a list of positions. Every position in the data structure is directly linked to the data structure that is used to store the measurements of the corresponding portion of the environment.

At the position 1510 where landmark that was added before, the scanner 120 computes the measurement error 1530 that is input into the SLAM algorithms to correct the error/drift accumulated from walking around the scanned portion of the environment, at block 1106. In one or more embodiments of the present disclosure, computing the measurement error 1530 includes moving the scanner 120 to an estimated position 1520. The estimated position is an estimate of the first scan position 1510 where the virtual landmark was recorded. In one or more embodiments of the present disclosure, the operator selects a "measure landmark" instruction 1214 at the estimated position 1520. In one or more examples, (see FIG. 12) the user-interface 1210 depicts to the operator the original view (e.g., photo) 1220 that was captured by the scanner 120 when the virtual landmark was recorded. A present view 1230 from the mobile device 43 is overlaid on the original image 1220 in a transparent manner. The operator can move the scanner 120 until the present view 1230 substantially matches the original image 1220 in the overlay. Once the operator indicates that the overlays match, the system records a relative observation of the present scan position 1520 of the scanner 120. The difference 1530 between the recorded position 1510 of the virtual landmark and the present position 1520 is used as the error correction to update and correct the mapping positions.

In one or more examples, the difference is computed as a difference in the original image 1220 and the present view 1230 when the scanner 120 is at the virtual landmark. For example, the difference between the images is computed based on the landmarks in the image 1220 and the present view 1230.

The method 1100 further includes using the measurement error 1530 to correct the coordinates captured by the scanner 120, at block 1108. The portion of the map 130 that is scanned and stored since capturing the virtual landmark is updated using the measurement error 1530, in one or more examples. In one or more examples, a loop closure operation is executed on the map 130, and parts of the map are corrected in order to match the real pose, which is the starting position 1510, with the estimated pose, which is the different position 1520. The loop closure algorithm calculates a displacement for each part of the map 130 that is shifted by the algorithm.

In one or more examples, the scanner 120 determines the scan positions 1610 linked to each portion of the map 130, at block 1110. In one or more examples, a lookup is performed over the data structure that saves the list of positions. The lookup costs a single processor operation, such as an array lookup. The scanner 120 applies the displacement vector for a portion of the map 130 to the corresponding scan positions saved in the data structure and saves the resulting displaced (or revised) scan positions back into the data structure, at block 1111. The scanner 120 computes displaced scan positions for each of the saved scan positions 1610 in the data structure. The procedure can be repeated every time the loop closure algorithm is applied.

The displaced scan positions represent corrected scan positions of the scans 805 that can be used directly without applying further computational expensive point cloud registration algorithms. The accuracy of the scan positions 1610 depends on the sensor accuracy of the scanner 120. As shown in FIG. 10, the displacement vectors 1810 for the portions of the map 130 are determined based on the loop closure operation. The scanner 120 applies the displacement vectors 1810 to the scan positions 1610 linked to the portions of the map by the data structure as described herein. The resulting displaced scan positions 1910 are accordingly calculated by applying the displacement vectors 1810 to the scan positions 1610. The displaced scan positions 1910 are now correctly located.

Figure 13:
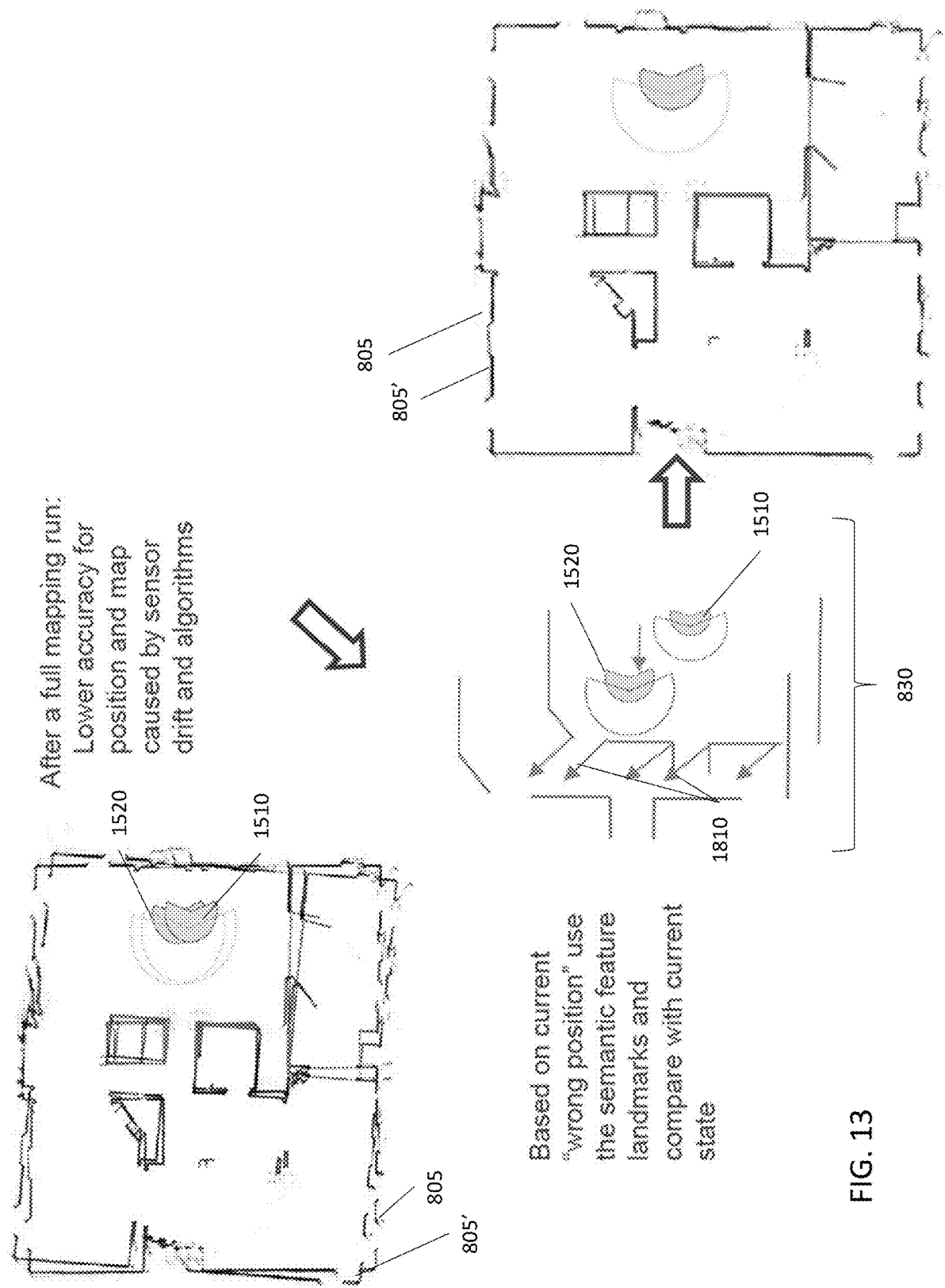
FIG. 13 depicts a resulting correction performed using landmarks from features according to one or more embodiments of the present disclosure.

FIG. 13 depicts a resulting correction performed using features at runtime according to one or more embodiments of the present disclosure. Two scans are shown, a first scan 805 captured from a first scan position 1510, and a second scan 805' captured from a second scan position 1520. Here, the second scan position 1520 is "wrong position" because the operator was trying to be substantially at the first position 1510. The "wrong position" is result of the drift. As can be seen, the views 805 and 805' are not aligned as a result of the drift. The features 830 are used to determine the offsets 1810 as described herein. The offsets 1810 are further used to determine the loop closure correction 1530, which is then applied to align the views 805 and 805'.

Figure 14:
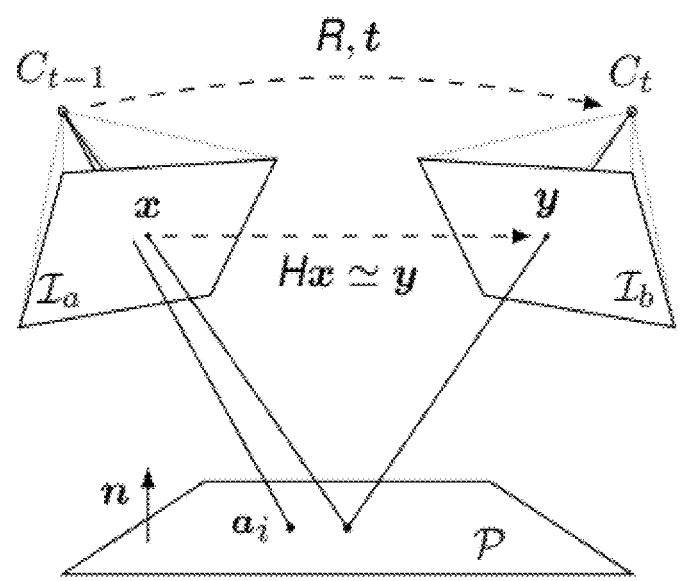
FIG. 14 depicts a block diagram of matching landmarks from one frame with another according to one or more embodiments of the present disclosure.

Referring again to the flowchart in FIG. 7, the method 700 includes determining a constraint for SLAM implementation at runtime based on the features 830. Determining the constraint includes generating a relationship by matching the features 830 that are detected from a first position 1610 with corresponding (same) features that are detected in an earlier frame. Here, each frame is captured at a particular pose of the scanner 120. The pose can include a position (i.e., coordinates in the environment), and orientation of the scanner 120. FIG. 14 depicts a block diagram of matching landmarks from one frame with another according to one or more embodiments of the present disclosure. $C_{t-1}$ depicts a first position of the scanner 120 at time t−1, and $C_t$ depicts a second position of the scanner 120 as it is moved to scan the environment. From each of these positions, the scanner 120 can observe and capture measurements of a plane P. The scanner 120 captures a scan Ia at the first position and a scan Ib at the second position. Each of these scans includes the plane P, which has a normal depicted by n.

Further, consider that the plane P has a landmark $a_i$ that is captured at a position x in the scan Ia from the first position; and further, that the landmark $a_i$ is at a position y in the second scan Ib that is captured from the second position. Matching the features detected from the first position 1610 and those detected from the second position 1620 includes determining the common features from the two positions. In this example scenario of FIG. 14, the landmark $a_i$ includes at least one of such common feature.

Once $a_i$ is determined, the matching further includes determining a relationship between the positions of the same feature from the separate scan positions. The relationship can be a mapping between the point x that represents the feature from the first position, and the point y that represents the same feature from the second position. For example, the computing system 110 determines a mapping such as Hx≈y. Here, H can be a matrix that translates and rotates x, where x and y can be 2D or 3D coordinates. In one or more embodiments of the present disclosure, x and y can be matrices that represent more than one point. H is a relative measurement constraint that can be used by the scanner when implementing the SLAM algorithm.

The SLAM algorithm can be implemented by the computing system 110, and/or the processor 124. Such use of the constraints generated from the landmarks and/or the semantic features 830 improves the final result of the SLAM algorithm (see FIG. 13).

As an example, consider the use of a feature that can be seen by the scanner 120 from various locations, which would be relative measurement constraints every time the scanner 120 sees a feature. So, SLAM can use those constraints in order to find the most likely configuration of the scanner path along with the location of features.

Embodiments of the present disclosure facilitate improvements to results of SLAM as well as loop closure, and consequently an improved scanning system for generating maps of an environment.

Figure 15:
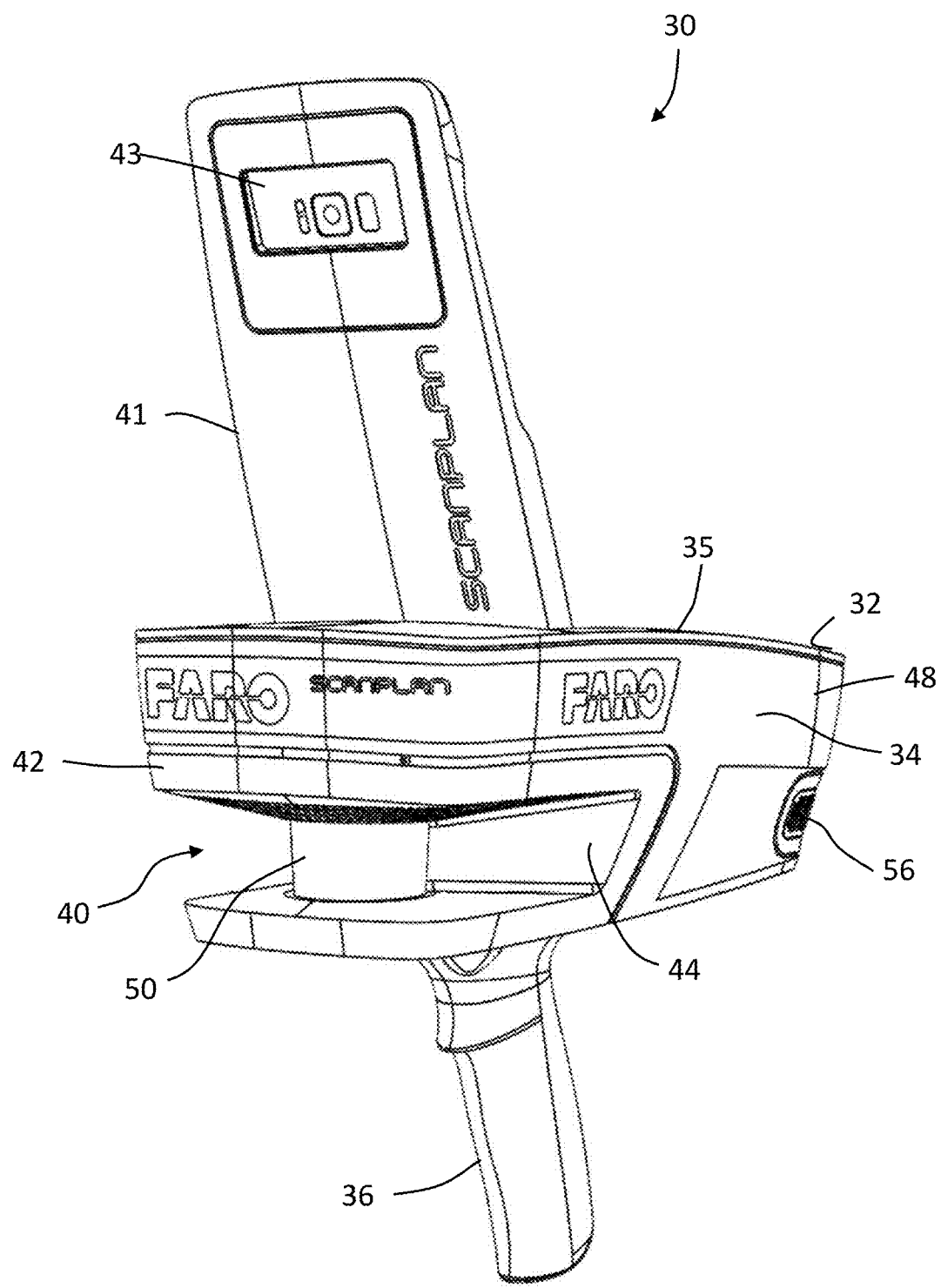
FIG. 15 depicts an embodiment of a scanner according to one or more embodiments of the present disclosure.
Figure 16:
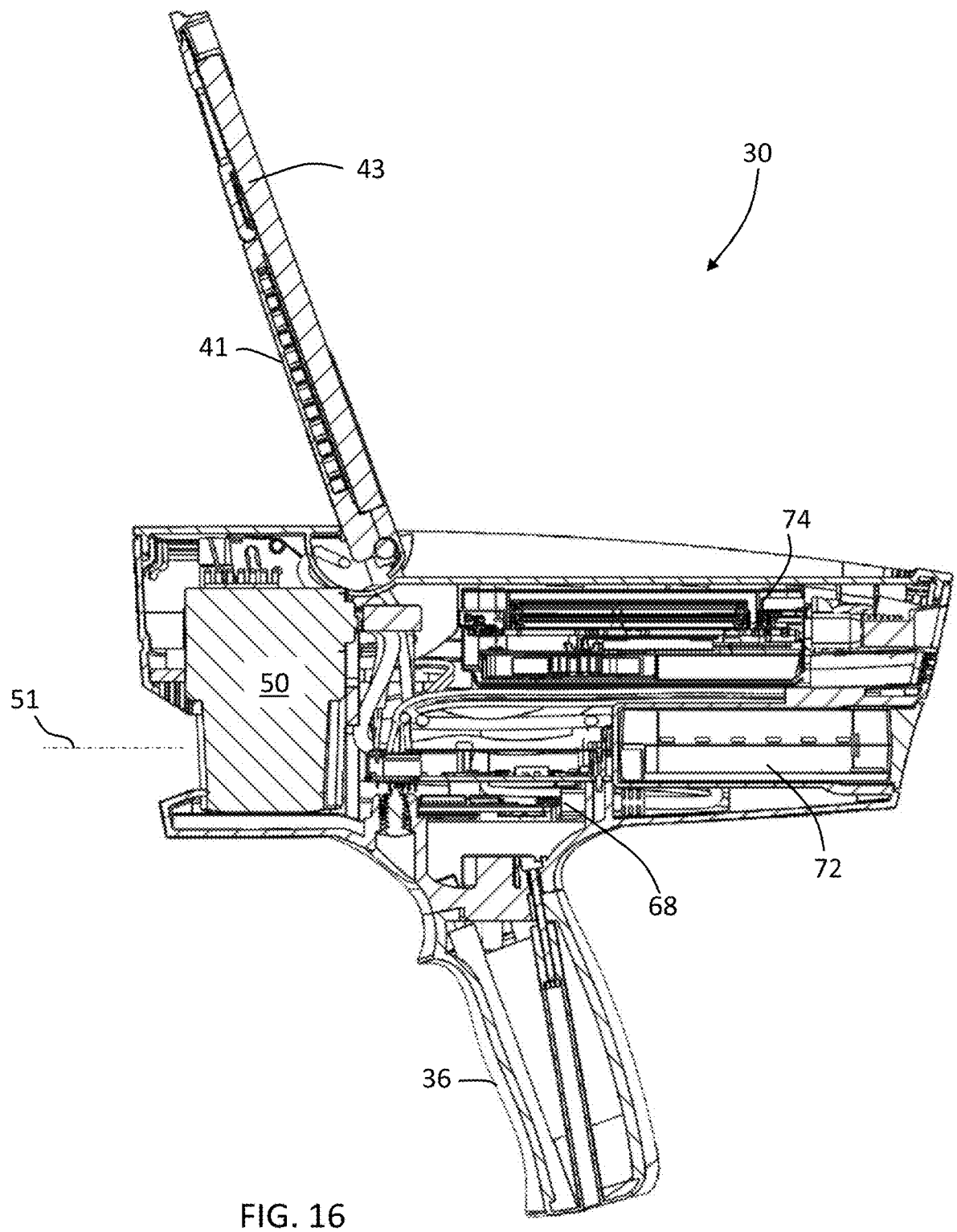
FIG. 16 depicts an embodiment of a scanner according to one or more embodiments of the present disclosure.
Figure 17:
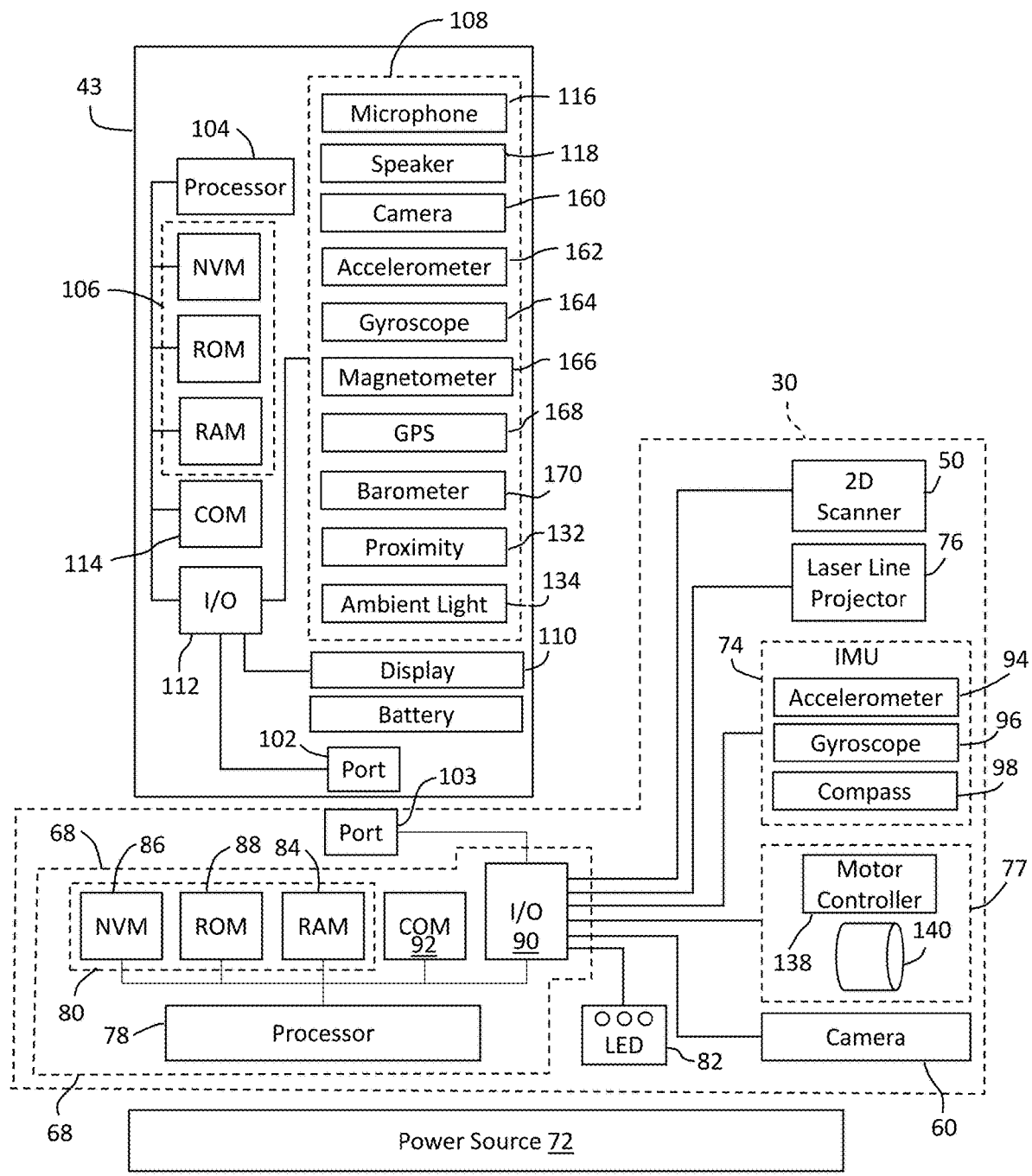
FIG. 17 depicts an embodiment of a scanner according to one or more embodiments of the present disclosure.

FIG. 15, FIG. 16, and FIG. 17 depict an embodiment of a system 30 having a housing 32 that includes a body portion 34 and a handle portion 36. The system 30 can be used as the scanner 120. In an embodiment, the handle 36 may include an actuator 38 that allows the operator to interact with the system 30. In the exemplary embodiment, the body 34 includes a generally rectangular center portion 35 with a slot 40 formed in an end 42. The slot 40 is at least partially defined by a pair walls 44 that are angled towards a second end 48. As will be discussed in more detail herein, a portion of a two-dimensional scanner 50 is arranged between the walls 44. The walls 44 are angled to allow the scanner 50 to operate by emitting a light over a large angular area without interference from the walls 44. As will be discussed in more detail herein, the end 42 may further include a three-dimensional camera or RGBD camera 60.

Extending from the center portion 35 is a mobile device holder 41. The mobile device holder 41 is configured to securely couple a mobile device 43 to the housing 32. The holder 41 may include one or more fastening elements, such as a magnetic or mechanical latching element for example, that couples the mobile device 43 to the housing 32. In an embodiment, the mobile device 43 is coupled to communicate with a controller 68. The communication between the controller 68 and the mobile device 43 may be via any suitable communications medium, such as wired, wireless or optical communication mediums for example.

In the illustrated embodiment, the holder 41 is pivotally coupled to the housing 32, such that it may be selectively rotated into a closed position within a recess 46. In an embodiment, the recess 46 is sized and shaped to receive the holder 41 with the mobile device 43 disposed therein.

In the exemplary embodiment, the second end 48 includes a plurality of exhaust vent openings 56. In an embodiment the exhaust vent openings 56 are fluidly coupled to intake vent openings 58 arranged on a bottom surface 62 of center portion 35. The intake vent openings 58 allow external air to enter a conduit 64 having an opposite opening 66 in fluid communication with the hollow interior 67 of the body 34. In an embodiment, the opening 66 is arranged adjacent to a controller 68 which has one or more processors that is operable to perform the methods described herein. In an embodiment, the external air flows from the opening 66 over or around the controller 68 and out the exhaust vent openings 56.

The controller 68 is coupled to a wall 70 of body 34. In an embodiment, the wall 70 is coupled to or integral with the handle 36. The controller 68 is electrically coupled to the 2D scanner 50, the 3D camera 60, a power source 72, an inertial measurement unit (IMU) 74, a laser line projector 76, and a haptic feedback device 77.

Elements are shown of the system 30 with the mobile device 43 installed or coupled to the housing 32. Controller 68 is a suitable electronic device capable of accepting data and instructions, executing the instructions to process the data, and presenting the results. The controller 68 includes one or more processing elements 78. The processors may be microprocessors, field programmable gate arrays (FPGAs), digital signal processors (DSPs), and generally any device capable of performing computing functions. The one or more processors 78 have access to memory 80 for storing information.

Controller 68 can convert the analog voltage or current level provided by 2D scanner 50, camera 60 and IMU 74 into a digital signal to determine a distance from the system 30 to an object in the environment. In an embodiment, the camera 60 is a 3D or RGBD type camera. Controller 68 uses the digital signals that act as input to various processes for controlling the system 30. The digital signals represent one or more system 30 data including but not limited to distance to an object, images of the environment, acceleration, pitch orientation, yaw orientation and roll orientation. As will be discussed in more detail, the digital signals may be from components internal to the housing 32 or from sensors and devices located in the mobile device 43.

In general, when the mobile device 43 is not installed, controller 68 accepts data from 2D scanner 50 and IMU 74 and is given certain instructions for the purpose of generating a two-dimensional map of a scanned environment. Controller 68 provides operating signals to the 2D scanner 50, the camera 60, laser line projector 76 and haptic feedback device 77. Controller 68 also accepts data from IMU 74, indicating, for example, whether the operator is operating in the system in the desired orientation. The controller 68 compares the operational parameters to predetermined variances (e.g. yaw, pitch or roll thresholds) and if the predetermined variance is exceeded, generates a signal that activates the haptic feedback device 77. The data received by the controller 68 may be displayed on a user-interface coupled to controller 68. The user-interface may be one or more LEDs (light-emitting diodes) 82, an LCD (liquid-crystal diode) display, a CRT (cathode ray tube) display, or the like. A keypad may also be coupled to the user-interface for providing data input to controller 68. In one embodiment, the user-interface is arranged or executed on the mobile device 43.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 78 are coupled to memory 80. The memory 80 may include random access memory (RAM) device 84, a non-volatile memory (NVM) device 86, a read-only memory (ROM) device 88. In addition, the processors 78 may be connected to one or more input/output (I/O) controllers 90 and a communications circuit 92. In an embodiment, the communications circuit 92 provides an interface that allows wireless or wired communication with one or more external devices or networks, such as the LAN discussed above.

Controller 68 includes operation control methods described herein, which can be embodied in application code. These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

Coupled to the controller 68 is the 2D scanner 50. The 2D scanner 50 measures 2D coordinates in a plane. In the exemplary embodiment, the scanning is performed by steering light within a plane to illuminate object points in the environment. The 2D scanner 50 collects the reflected (scattered) light from the object points to determine 2D coordinates of the object points in the 2D plane. In an embodiment, the 2D scanner 50 scans a spot of light over an angle while at the same time measuring an angle value and corresponding distance value to each of the illuminated object points.

Examples of 2D scanners 50 include but are not limited to Model LMS103 scanners manufactured by Sick, Inc of Minneapolis, Minn. and scanner Models URG-04LX-UG01 and UTM-30LX manufactured by Hokuyo Automatic Co., Ltd of Osaka, Japan. The scanners in the Sick LMS103 family measure angles over a 270-degree range and over distances up to 20 meters. The Hoyuko model URG-04LX-UGO1 is a low-cost 2D scanner that measures angles over a 240-degree range and distances up to 4 meters. The Hoyuko model UTM-30LX is a 2D scanner that measures angles over a 270-degree range and to distances up to 30 meters. It should be appreciated that the above 2D scanners are exemplary and other types of 2D scanners are also available.

In an embodiment, the 2D scanner 50 is oriented so as to scan a beam of light over a range of angles in a generally horizontal plane (relative to the floor of the environment being scanned). At instants in time the 2D scanner 50 returns an angle reading and a corresponding distance reading to provide 2D coordinates of object points in the horizontal plane. In completing one scan over the full range of angles, the 2D scanner returns a collection of paired angle and distance readings. As the system 30 is moved from place to place, the 2D scanner 50 continues to return 2D coordinate values. These 2D coordinate values are used to locate the position of the system 30 thereby enabling the generation of a two-dimensional map or floorplan of the environment.

Also coupled to the controller 68 is the IMU 74. The IMU 74 is a position/orientation sensor that may include accelerometers 94 (inclinometers), gyroscopes 96, a magnetometer or compass 98, and altimeters. In the exemplary embodiment, the IMU 74 includes multiple accelerometers 94 and gyroscopes 96. The compass 98 indicates a heading based on changes in magnetic field direction relative to the earth's magnetic north. The IMU 74 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 74 determines the pose or orientation of the system 30 about three-axis to allow a determination of a yaw, roll and pitch parameter.

The system 30 further includes a camera 60 that is a 3D or RGB-D camera. As used herein, the term 3D camera refers to a device that produces a two-dimensional image that includes distances to a point in the environment from the location of system 30. The 3D camera 30 may be a range camera or a stereo camera. In an embodiment, the 3D camera 30 includes an RGB-D sensor that combines color information with a per-pixel depth information. In an embodiment, the 3D camera 30 may include an infrared laser projector 31, a left infrared camera 33, a right infrared camera 39, and a color camera 37. In an embodiment, the 3D camera 60 is a RealSense™ camera model R200 manufactured by Intel Corporation. In still another embodiment, the 3D camera 30 is a RealSense™ LIDAR camera model L515 manufactured by Intel Corporation.

In an embodiment, when the mobile device 43 is coupled to the housing 32, the mobile device 43 becomes an integral part of the system 30. In an embodiment, the mobile device 43 is a cellular phone, a tablet computer or a personal digital assistant (PDA). The mobile device 43 may be coupled for communication via a wired connection, such as ports 103, 102. The port 103 is coupled for communication to the processor 78, such as via I/O controller 90 for example. The ports 103, 102 may be any suitable port, such as but not limited to USB, USB-A, USB-B, USB-C, IEEE 1394 (Firewire), or Lightning™ connectors.

The mobile device 43 is a suitable electronic device capable of accepting data and instructions, executing the instructions to process the data, and presenting the results. The mobile device 43 includes one or more processing elements 104. The processors may be microprocessors, field programmable gate arrays (FPGAs), digital signal processors (DSPs), and generally any device capable of performing computing functions. The one or more processors 104 have access to memory 106 for storing information.

The mobile device 43 can convert the analog voltage or current level provided by sensors 108 and processor 78. Mobile device 43 uses the digital signals that act as input to various processes for controlling the system 30. The digital signals represent one or more system 30 data including but not limited to distance to an object, images of the environment, acceleration, pitch orientation, yaw orientation, roll orientation, global position, ambient light levels, and altitude for example.

In general, mobile device 43 accepts data from sensors 108 and is given certain instructions for the purpose of generating or assisting the processor 78 in the generation of a two-dimensional map or three-dimensional map of a scanned environment. Mobile device 43 provides operating signals to the processor 78, the sensors 108 and a display 110. Mobile device 43 also accepts data from sensors 108, indicating, for example, to track the position of the mobile device 43 in the environment or measure coordinates of points on surfaces in the environment. The mobile device 43 compares the operational parameters to predetermined variances (e.g. yaw, pitch or roll thresholds) and if the predetermined variance is exceeded, may generate a signal. The data received by the mobile device 43 may be displayed on display 110. In an embodiment, the display 110 is a touch screen device that allows the operator to input data or control the operation of the system 30.

The controller 68 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 104 are coupled to memory 106. The memory 106 may include random access memory (RAM) device, a non-volatile memory (NVM) device, and a read-only memory (ROM) device. In addition, the processors 104 may be connected to one or more input/output (I/O) controllers 112 and a communications circuit 114. In an embodiment, the communications circuit 114 provides an interface that allows wireless or wired communication with one or more external devices or networks, such as the LAN or the cellular network discussed above.

Processor 104 includes operation control methods described herein, which can be embodied in application code. These methods are embodied in computer instructions written to be executed by processors 78, 104, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

Also coupled to the processor 104 are the sensors 108. The sensors 108 may include but are not limited to: a microphone 116; a speaker 118; a front or rear facing camera 160; accelerometers 162 (inclinometers), gyroscopes 164, a magnetometers or compass 126; a global positioning satellite (GPS) module 168; a barometer 170; a proximity sensor 132; and an ambient light sensor 134. By combining readings from a combination of sensors 108 with a fusion algorithm that may include a Kalman filter, relatively accurate position and orientation measurements can be obtained.

It should be appreciated that the sensors 60, 74 integrated into the scanner 30 may have different characteristics than the sensors 108 of mobile device 43. For example, the resolution of the cameras 60, 160 may be different, or the accelerometers 94, 162 may have different dynamic ranges, frequency response, sensitivity (mV/g) or temperature parameters (sensitivity or range). Similarly, the gyroscopes 96, 164 or compass/magnetometer may have different characteristics. It is anticipated that in some embodiments, one or more sensors 108 in the mobile device 43 may be of higher accuracy than the corresponding sensors 74 in the system 30. As described in more detail herein, in some embodiments the processor 78 determines the characteristics of each of the sensors 108 and compares them with the corresponding sensors in the system 30 when the mobile device. The processor 78 then selects which sensors 74, 108 are used during operation. In some embodiments, the mobile device 43 may have additional sensors (e.g. microphone 116, camera 160) that may be used to enhance operation compared to operation of the system 30 without the mobile device 43. In still further embodiments, the system 30 does not include the IMU 74 and the processor 78 uses the sensors 108 for tracking the position and orientation/pose of the system 30. In still further embodiments, the addition of the mobile device 43 allows the system 30 to utilize the camera 160 to perform three-dimensional (3D) measurements either directly (using an RGB-D camera) or using photogrammetry techniques to generate 3D maps. In an embodiment, the processor 78 uses the communications circuit (e.g. a cellular 4G internet connection) to transmit and receive data from remote computers or devices.

In the exemplary embodiment, the system 30 is a handheld portable device that is sized and weighted to be carried by a single person during operation. Therefore, the plane 136 in which the 2D scanner 50 projects a light beam may not be horizontal relative to the floor or may continuously change as the computer moves during the scanning process. Thus, the signals generated by the accelerometers 94, gyroscopes 96 and compass 98 (or the corresponding sensors 108) may be used to determine the pose (yaw, roll, tilt) of the system 30 and determine the orientation of the plane 51.

In an embodiment, it may be desired to maintain the pose of the system 30 (and thus the plane 136) within predetermined thresholds relative to the yaw, roll and pitch orientations of the system 30. In an embodiment, a haptic feedback device 77 is disposed within the housing 32, such as in the handle 36. The haptic feedback device 77 is a device that creates a force, vibration or motion that is felt or heard by the operator. The haptic feedback device 77 may be, but is not limited to: an eccentric rotating mass vibration motor or a linear resonant actuator for example. The haptic feedback device is used to alert the operator that the orientation of the light beam from 2D scanner 50 is equal to or beyond a predetermined threshold. In operation, when the IMU 74 measures an angle (yaw, roll, pitch or a combination thereof), the controller 68 transmits a signal to a motor controller 138 that activates a vibration motor 140. Since the vibration originates in the handle 36, the operator will be notified of the deviation in the orientation of the system 30. The vibration continues until the system 30 is oriented within the predetermined threshold or the operator releases the actuator 38. In an embodiment, it is desired for the plane 136 to be within 10-15 degrees of horizontal (relative to the ground) about the yaw, roll and pitch axes.

Figure 18:
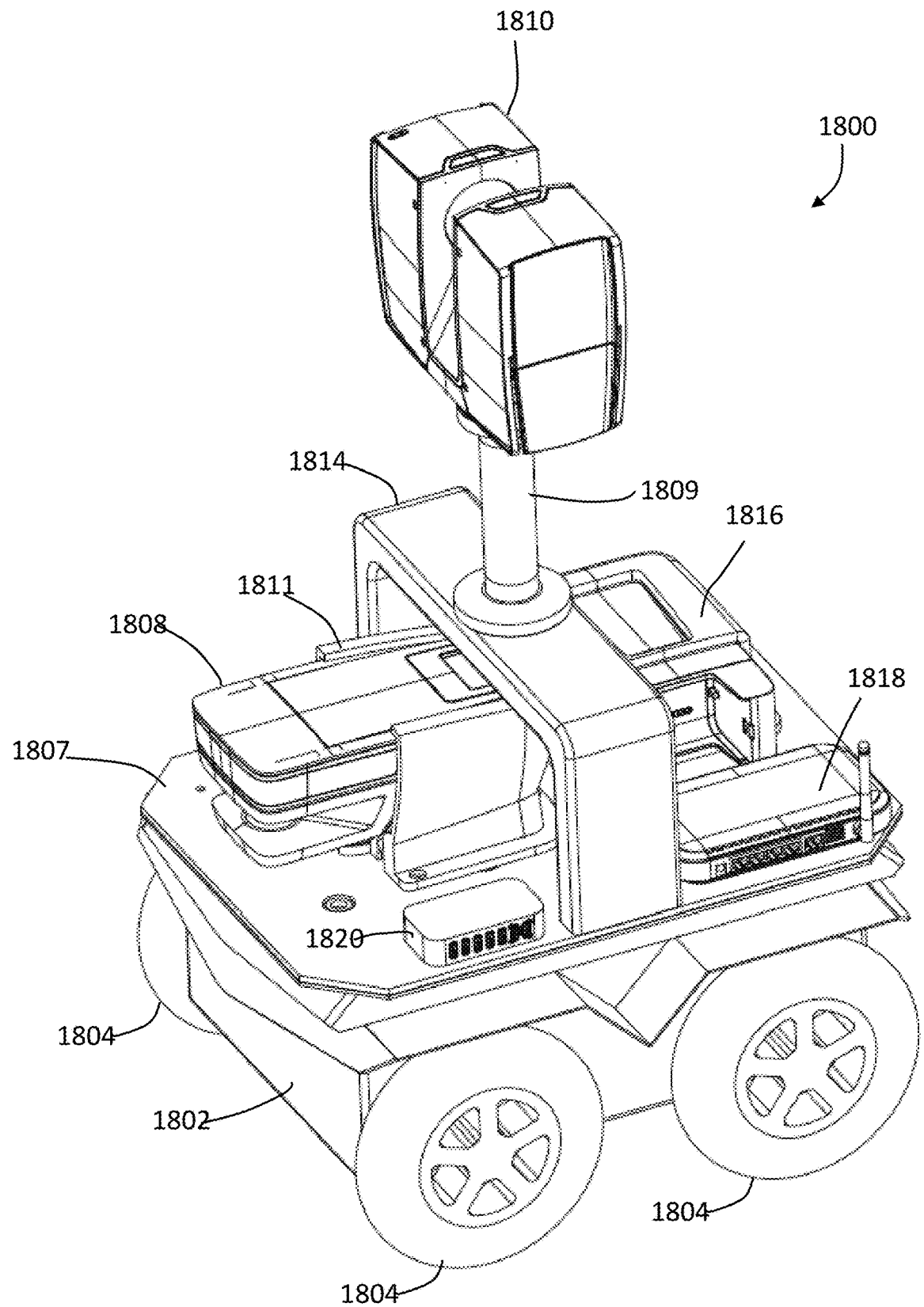
FIG. 18 depicts an embodiment of a scanner according to one or more embodiments of the present disclosure.
Figure 19:
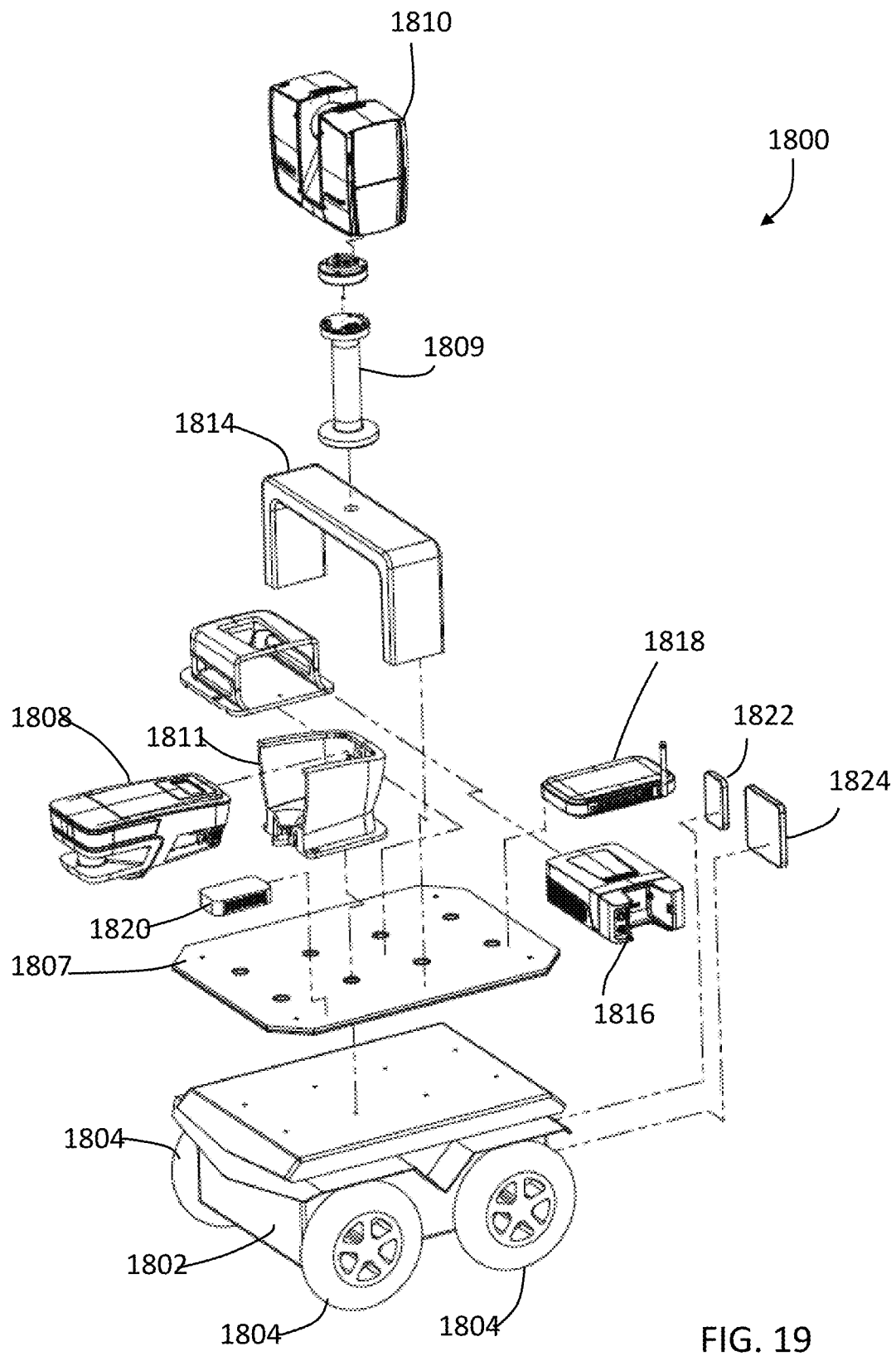
FIG. 19 depicts an embodiment of a scanner according to one or more embodiments of the present disclosure.
Figure 20:
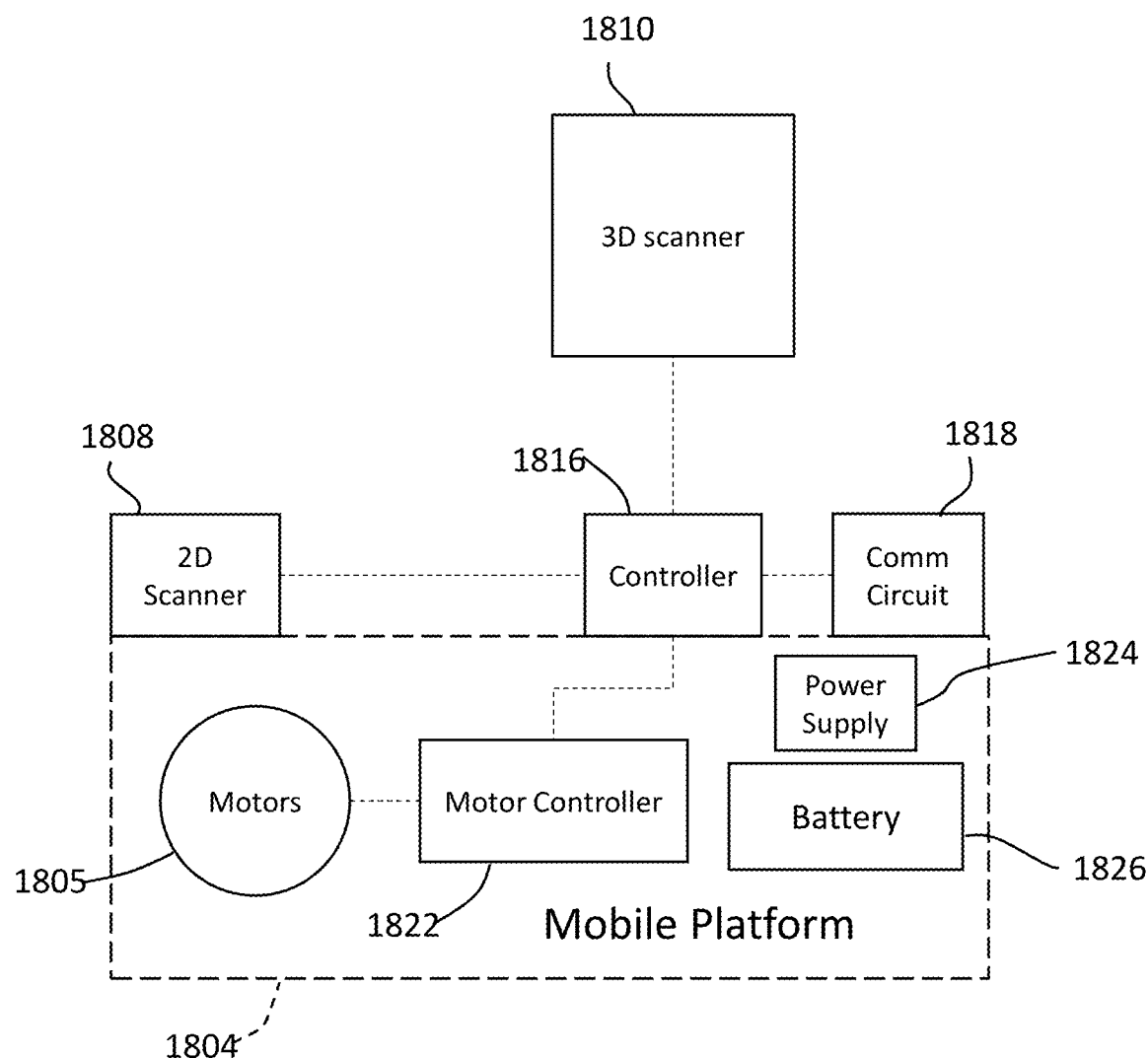
FIG. 20 depicts an embodiment of a scanner according to one or more embodiments of the present disclosure.

Referring now to FIG. 18, FIG. 19, and FIG. 20, an embodiment is shown of a mobile scanning platform 1800. The mobile scanning platform 1800 can be used as the scanner 120. The mobile scanning platform 1800 includes a base unit 1802 having a plurality of wheels 1804. The wheels 1804 are rotated by motors 1805. In an embodiment, an adapter plate 1807 is coupled to the base unit 1802 to allow components and modules to be coupled to the base unit 1802. The mobile scanning platform 1800 further includes a 2D scanner 1808 and a 3D scanner 1810. In the illustrated embodiment, each scanner 1808, 1810 is removably coupled to the adapter plate 1806. The 2D scanner 1808 may be the scanner illustrated and described herein. As will be described in more detail herein, in some embodiments the 2D scanner 1808 is removable from the adapter plate 1806 and is used to generate a map of the environment, plan a path for the mobile scanning platform to follow, and define 3D scanning locations. In the illustrated embodiment, the 2D scanner 1808 is slidably coupled to a bracket 1811 that couples the 2D scanner 1808 to the adapter plate 1807.

In an embodiment, the 3D scanner 1810 is a time-of-flight (TOF) laser scanner such as that shown and described herein. The scanner 1810 may be that described in commonly owned U.S. Pat. No. 8,705,012, which is incorporated by reference herein. In an embodiment, the 3D scanner 1810 mounted on a pedestal or post 1809 that elevates the 3D scanner 1810 above (e.g. further from the floor than) the other components in the mobile scanning platform 1800 so that the emission and receipt of the light beam is not interfered with. In the illustrated embodiment, the pedestal 1809 is coupled to the adapter plate 1807 by a u-shaped frame 1814.

In an embodiment, the mobile scanning platform 1800 further includes a controller 1816. The controller 1816 is a computing device having one or more processors and memory. The one or more processors are responsive to non-transitory executable computer instructions for performing operational methods such as those described herein. The processors may be microprocessors, field programmable gate arrays (FPGAs), digital signal processors (DSPs), and generally any device capable of performing computing functions. The one or more processors have access to memory for storing information.

Coupled for communication to the controller 1816 is a communications circuit 1818 and an input/output hub 1820. In the illustrated embodiment, the communications circuit 1818 is configured to transmit and receive data via a wireless radio-frequency communications medium, such as WIFI or Bluetooth for example. In an embodiment, the 2D scanner 1808 communicates with the controller 1816 via the communications circuit 1818

In an embodiment, the mobile scanning platform 1800 further includes a motor controller 1822 that is operably coupled to the control the motors 1805. In an embodiment, the motor controller 1822 is mounted to an external surface of the base unit 1802. In another embodiment, the motor controller 1822 is arranged internally within the base unit 1802. The mobile scanning platform 1800 further includes a power supply 1824 that controls the flow of electrical power from a power source, such as batteries 1826 for example. The batteries 1826 may be disposed within the interior of the base unit 1802. In an embodiment, the base unit 1802 includes a port (not shown) for coupling the power supply to an external power source for recharging the batteries 1826. In another embodiment, the batteries 1826 are removable or replaceable.

It should be appreciated that while embodiments herein describe supporting the registration of landmarks in a 3D point cloud generated by a phase-shift TOF laser scanner, this is, for example, purposes and the claims should not be so limited. In other embodiments, the 3D coordinate data or point cloud may be generated by any type of 3D measurement device, such as but not limited to a pulsed TOF laser scanner, frequency modulated continuous wave (FMCW) scanner, triangulation scanner, an area scanner, a structured light scanner, a laser line probe, a laser tracker, or a combination of the foregoing. Further, it should be appreciated that the examples described herein show top views of scan data; however, side views can also be used for registration, and such registration can also be improved as described herein.

It should be appreciated that while 3D coordinate data may be used for training, the methods described herein for verifying the registration of landmarks may be used with either two-dimensional or three-dimensional data sets.

Technical effects and benefits of the disclosed embodiments include, but are not limited to, increasing scan quality and a visual appearance of scans acquired by the 3D coordinate measurement device.

Figure 21:
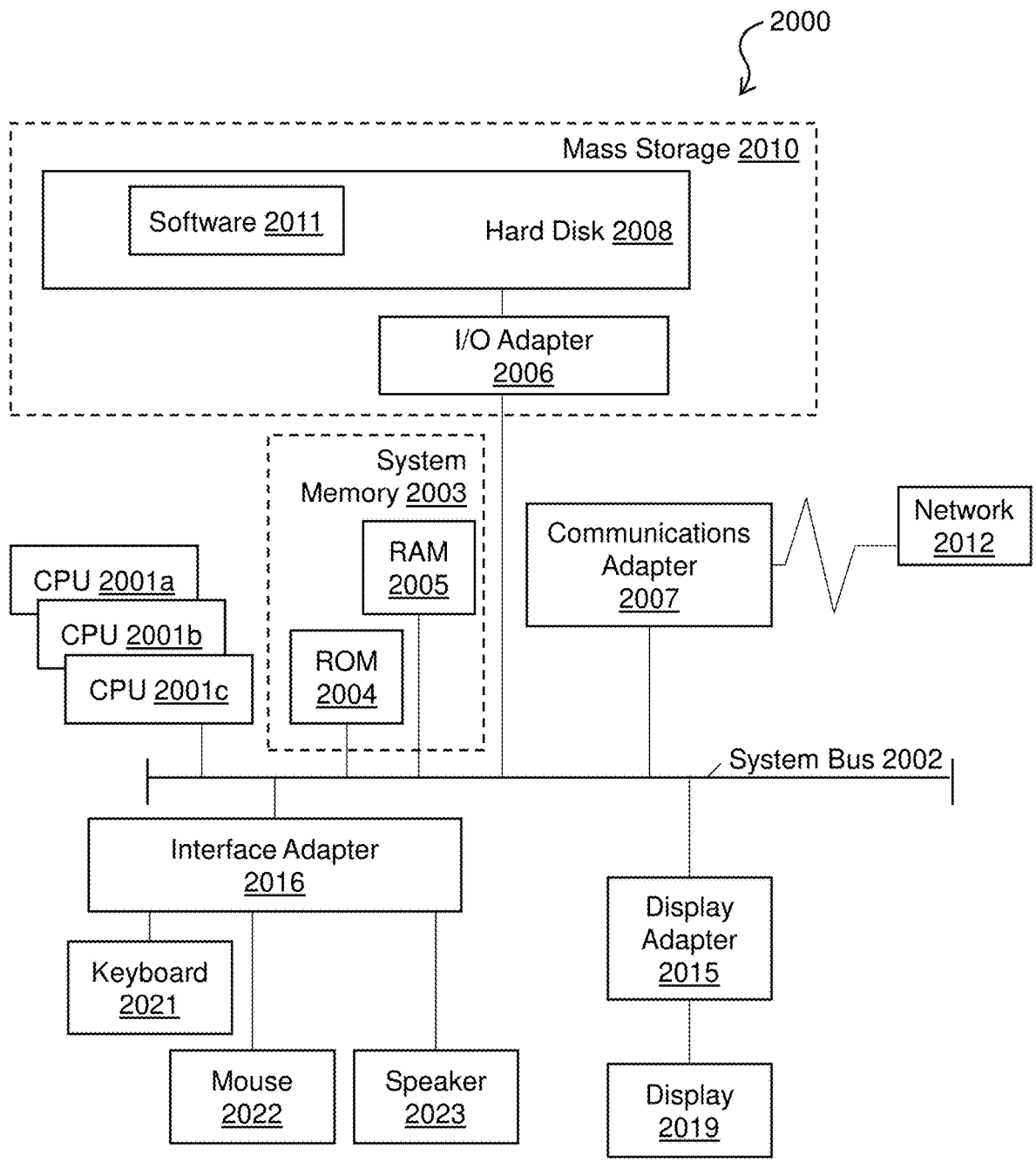
FIG. 21 depicts a computing system that can implement one or more embodiments of the present disclosure.

Turning now to FIG. 21, a computer system 2100 is generally shown in accordance with an embodiment. The computer system 2100 can be an electronic, computer framework comprising and/or employing any number and combination of computing devices and networks utilizing various communication technologies, as described herein. The computer system 2100 can be easily scalable, extensible, and modular, with the ability to change to different services or reconfigure some features independently of others. The computer system 2100 may be, for example, a server, desktop computer, laptop computer, tablet computer, or smartphone. In some examples, computer system 2100 may be a cloud computing node. Computer system 2100 may be described in the general context of computer system executable instructions, such as program modules, being executed by a computer system. Generally, program modules may include routines, programs, objects, components, logic, data structures, and so on that perform particular tasks or implement particular abstract data types. Computer system 2100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 21, the computer system 2100 has one or more central processing units (CPU(s)) 2101a, 2101b, 2101c, etc. (collectively or generically referred to as processor(s) 2101). The processors 2101 can be a single-core processor, multi-core processor, computing cluster, or any number of other configurations. The processors 2101, also referred to as processing circuits, are coupled via a system bus 2102 to a system memory 2103 and various other components. The system memory 2103 can include a read only memory (ROM) 2104 and a random access memory (RAM) 2105. The ROM 2104 is coupled to the system bus 2102 and may include a basic input/output system (BIOS), which controls certain basic functions of the computer system 2100. The RAM is read-write memory coupled to the system bus 2102 for use by the processors 2101. The system memory 2103 provides temporary memory space for operations of said instructions during operation. The system memory 2103 can include random access memory (RAM), read only memory, flash memory, or any other suitable memory systems.

The computer system 2100 comprises an input/output (I/O) adapter 2106 and a communications adapter 2107 coupled to the system bus 2102. The I/O adapter 2106 may be a small computer system interface (SCSI) adapter that communicates with a hard disk 2108 and/or any other similar component. The I/O adapter 2106 and the hard disk 2108 are collectively referred to herein as a mass storage 2110.

Software 2111 for execution on the computer system 2100 may be stored in the mass storage 2110. The mass storage 2110 is an example of a tangible storage medium readable by the processors 2101, where the software 2111 is stored as instructions for execution by the processors 2101 to cause the computer system 2100 to operate, such as is described herein below with respect to the various Figures. Examples of computer program product and the execution of such instruction is discussed herein in more detail. The communications adapter 2107 interconnects the system bus 2102 with a network 2112, which may be an outside network, enabling the computer system 2100 to communicate with other such systems. In one embodiment, a portion of the system memory 2103 and the mass storage 2110 collectively store an operating system, which may be any appropriate operating system to coordinate the functions of the various components shown in FIG. 21.

Additional input/output devices are shown as connected to the system bus 2102 via a display adapter 2115 and an interface adapter 2116 and. In one embodiment, the adapters 2106, 2107, 2115, and 2116 may be connected to one or more I/O buses that are connected to the system bus 2102 via an intermediate bus bridge (not shown). A display 2119 (e.g., a screen or a display monitor) is connected to the system bus 2102 by a display adapter 2115, which may include a graphics controller to improve the performance of graphics intensive applications and a video controller. A keyboard 2121, a mouse 2122, a speaker 2123, etc. can be interconnected to the system bus 2102 via the interface adapter 2116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 21, the computer system 2100 includes processing capability in the form of the processors 2101, and, storage capability including the system memory 2103 and the mass storage 2110, input means such as the keyboard 2121 and the mouse 2122, and output capability including the speaker 2123 and the display 2119.

In some embodiments, the communications adapter 2107 can transmit data using any suitable interface or protocol, such as the internet small computer system interface, among others. The network 2112 may be a cellular network, a radio network, a wide area network (WAN), a local area network (LAN), or the Internet, among others. An external computing device may connect to the computer system 2100 through the network 2112. In some examples, an external computing device may be an external webserver or a cloud computing node.

It is to be understood that the block diagram of FIG. 21 is not intended to indicate that the computer system 2100 is to include all of the components shown in FIG. 21. Rather, the computer system 2100 can include any appropriate fewer or additional components not illustrated in FIG. 21 (e.g., additional memory components, embedded controllers, modules, additional network interfaces, etc.). Further, the embodiments described herein with respect to computer system 2100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It will be appreciated that aspects of the present disclosure may be embodied as a system, method, or computer program product and may take the form of a hardware embodiment, a software embodiment (including firmware, resident software, micro-code, etc.), or a combination thereof. Furthermore, aspects of the present disclosure may take the form of a computer program product embodied in one or more computer-readable medium(s) having computer-readable program code embodied thereon.

One or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer-readable storage medium may be a tangible medium containing or storing a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

The computer-readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present disclosure are described herein with reference to flowchart illustrations and/or block diagrams of methods, apparatus (systems) and computer program products according to embodiments. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope. Additionally, while various embodiments have been described, it is to be understood that aspects may include only some of the described embodiments. Accordingly, the invention is not to be seen as limited by the foregoing description but is only limited by the scope of the appended claims.

What is claimed is:

1. A system comprising:
   a scanner device configured to capture scan-data of a surrounding environment; and
   one or more processors operably coupled to the scanner device, wherein the one or more processors are operable to perform simultaneous locating and mapping of the scanner device in the surrounding environment, which comprises:
   capturing the scan-data of a portion of a map of the surrounding environment, wherein the scan-data comprises a point cloud;
   receiving, at runtime, via a user-interface, a selection of a feature from the scan-data, and a selection of a submap that was previously captured, wherein the submap includes the same feature;
   determining a first scan position as a present position of the scanner device, and determine a second scan position as a position of the scanner device;
   determining a displacement vector for the map based on a difference between the first scan position and the second scan position;
   computing a revised first scan position based on the second scan position and the displacement vector; and
   registering the scan-data using the revised first scan position.

2. The system of claim 1, the one or more processors are operable to assign a unique identifier to the feature.

3. The system of claim 1, wherein the feature comprises a semantic feature in the map.

4. The system of claim 1, wherein the feature comprises a predetermined area in the map.

5. The system of claim 1, wherein the one or more processors are configured to provide, via the user-interface, an identification of one or more features in the scan-data.

6. The system of claim 1, wherein the one or more processors are configured to provide, via the user-interface, a list of submaps that include the feature that is selected.

7. The system of claim 1, wherein the scanner device is equipped on a movable platform.

8. The system of claim 1, wherein the one or more processors are further operable to:
   determine a constraint by computing a relationship between a first measurement and a second measurement of the feature, the first measurement captured from the first scan position, and the second measurement captured from a third scan position; and perform the simultaneous locating and mapping by using the constraint.

9. A method for performing a simultaneous location and mapping of a scanner device in a surrounding environment, the method comprising:
  capturing a scan-data of a portion of a map of the surrounding environment, wherein the scan-data comprises a point cloud;
  receiving, at runtime, via a user-interface, a selection of a feature from the scan-data, and a selection of a submap that was previously captured, wherein the submap includes the same feature;
  determining a first scan position as a present position of the scanner device, and determining a second scan position as a position of the scanner device;
  determining a displacement vector for the map based on a difference between the first scan position and the second scan position;
  computing a revised first scan position based on the second scan position and the displacement vector; and
  registering the scan-data using the revised first scan position.

10. The method of claim 9, the method further comprises assigning a unique identifier to the feature.

11. The method of claim 9, wherein the feature comprises a semantic feature in the map.

12. The method of claim 9, wherein the feature comprises a predetermined area in the map.

13. The method of claim 9, wherein the method further comprises providing, via the user-interface, an identification of one or more features in the scan-data.

14. The method of claim 9, wherein the method further comprises providing, via the user-interface, a list of submaps that include the feature that is selected.

15. The method of claim 9, wherein the scanner device is equipped on a movable platform.

16. The method of claim 9, wherein the method further comprises:
  determining a constraint by computing a relationship between a first measurement and a second measurement of the feature, the first measurement captured from the first scan position, and the second measurement captured from a third scan position; and
  performing the simultaneous locating and mapping by using the constraint.

17. A non-transitory computer-readable medium having program instructions embodied therewith, the program instructions readable by a processor to cause the processor to perform a method performing a simultaneous location and mapping of a scanner device in a surrounding environment, the method comprising:
  capturing a scan-data of a portion of a map of the surrounding environment, wherein the scan-data comprises a point cloud;
  receiving, at runtime, via a user-interface, a selection of a feature from the scan-data, and a selection of a submap that was previously captured, wherein the submap includes the same feature;
  determining a first scan position as a present position of the scanner device, and determine a second scan position as a position of the scanner device;
  determining a displacement vector for the map based on a difference between the first scan position and the second scan position;
  computing a revised first scan position based on the second scan position and the displacement vector; and
  registering the scan-data using the revised first scan position.

18. The computer-readable medium of claim 17, wherein the method further comprises providing, via the user-interface, an identification of one or more features in the scan-data.

19. The computer-readable medium of claim 17, wherein the method further comprises providing, via the user-interface, a list of submaps that include the feature that is selected.

20. The computer-readable medium of claim 17, wherein the method further comprises:
  determining a constraint by computing a relationship between a first measurement and a second measurement of the feature, the first measurement captured from the first scan position, and the second measurement captured from a third scan position; and
  performing the simultaneous locating and mapping by using the constraint.

* * * * *